United States Patent [19]
Hurley et al.

[11] Patent Number: 5,231,487
[45] Date of Patent: Jul. 27, 1993

[54] STORAGE OF VIDEO SIGNALS

[75] Inventors: Terence R. Hurley, Newbury; Jonathan J. Stone, Reading; James H. Wilkinson, Tadley, all of England

[73] Assignee: Sony Broadcast & Communications Ltd., Basingstoke, England

[21] Appl. No.: 810,335

[22] Filed: Dec. 19, 1991

[30] Foreign Application Priority Data

Jan. 11, 1991 [GB] United Kingdom ................ 9100592

[51] Int. Cl.$^5$ .................. H04N 7/133; H04N 9/80; H04N 5/92
[52] U.S. Cl. ..................... 358/133; 358/12; 358/13; 358/138; 358/310; 358/312; 358/335
[58] Field of Search ............ 358/133, 135, 136, 138, 358/310, 312, 335, 12, 13

[56] References Cited

U.S. PATENT DOCUMENTS

| | | | |
|---|---|---|---|
| 4,780,761 | 10/1988 | Daly | 358/133 |
| 4,969,040 | 11/1990 | Gharavi | 358/136 |
| 5,049,992 | 9/1991 | Citta | 358/11 |
| 5,136,391 | 8/1992 | Minami | 358/310 |

FOREIGN PATENT DOCUMENTS

| | | |
|---|---|---|
| 0130071 | 2/1985 | European Pat. Off. |
| 0310175 | 4/1989 | European Pat. Off. |
| 0339589 | 11/1989 | European Pat. Off. |
| 0367264 | 5/1990 | European Pat. Off. |
| 0383678 | 8/1990 | European Pat. Off. |
| 0396368 | 11/1990 | European Pat. Off. |
| 2211691 | 7/1989 | United Kingdom |
| WO88/10050 | 5/1988 | World Int. Prop. O. |

OTHER PUBLICATIONS

Proceedings ICASSP 1989, vol. 3, May 23–26, 1989, IEEE New York, US, pp. 1945–1948, R. Safranek et al.: A Perceptually tuned Sub-Band Coder With Image Dependent Quantization and Post-Quantization Data Compression.
Optical Engineering vol. 27, No. 7, Jul. 1988, Bellingham US pp. 574–586; G. Karlsson et al.: Subband Coding of Video For Packet Networks see paragraph 3–paragraph 42; FIG. 4–8.
Signal Processing Image Communication vol. 2, No. 3, Oct. 1990, Amsterdam, NL pp. 333–341; K. Irie et al.: Adaptive Sub-band DCT coding for HDTV Signal Transmission see paragraph 2; FIG. 1–4; tables 1–4.
IEEE Transactions on Communications. vol. COM34, No. 3, Mar. 1986, New York US pp. 310–319—see code 4, p. 316; E. Dubois et al.: Encoding and Progressive Transmission of Still Pictures in NTSC Composite Format Using Transform Domain Methods.

Primary Examiner—Howard W. Britton
Attorney, Agent, or Firm—William S. Frommer; Alvin Sinderbrand

[57] ABSTRACT

Apparatus for storing a video signal includes a signal compression arrangement constituted by a spatial two-dimensional sub-band filtering arrangement that filters a digital video signal to form data sets constituting respective sub-bands of the two-dimensional spatial frequency domain, a quantizer that quantizes the data sets in accordance with respective values which are such that the amount of quantization of one of the data sets constituting a sub-band to which dc luminance information of the signal is at least predominantly confined is less than the average of the amounts of quantization of the remaining data sets, and an entropy encoder that selectively encodes at least some of the quantized data sets so that the quantized data sets, as selectively entropy encoded, form a compressed video signal. The signal compression arrangement is followed by a storage arrangement for storing the compressed video signal.

14 Claims, 12 Drawing Sheets

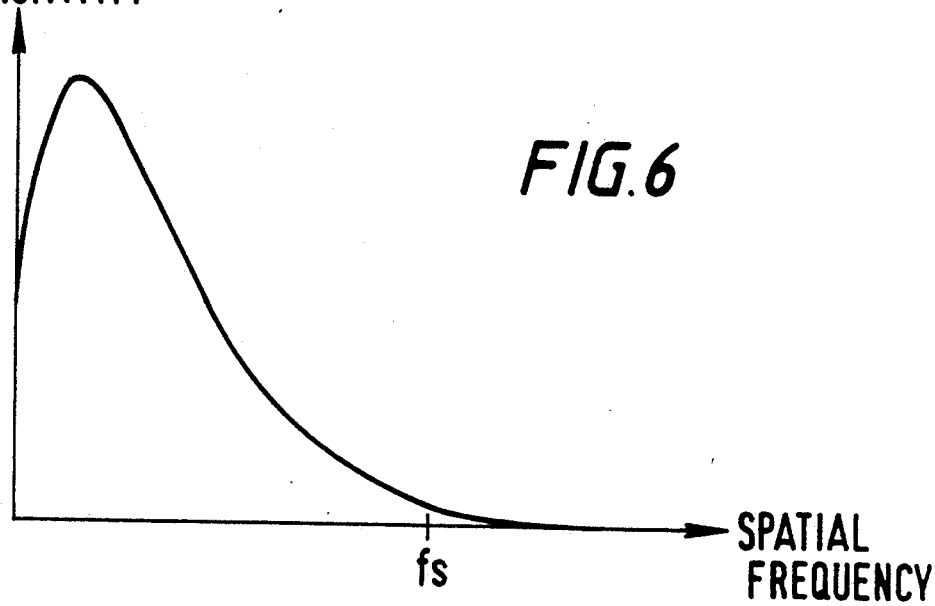

| FLC | SIZE |
|---|---|
| −1,1 | 1 |
| −3,−2,2,3 | 2 |
| −7,...−4,4,...7 | 3 |
| −15,...−8,8,...15 | 4 |
| −31,...−16,16,....31 | 5 |
| −63,......−32,32,......63 | 6 |
| −127,........−64,64,........127 | 7 |
| −255,.........−128,128,.........255 | 8 |
| −511,...........−256,256,...........511 | 9 |
| −1023,............−512,512,............1023 | 10 |
| −2047,.............−1024,1024,.............2047 | 11 |
| −4095,...............−2048,2048,...............4095 | 12 |

STORAGE OF VIDEO SIGNALS

BACKGROUND OF THE INVENTION

1. Field of the Invention

This invention relates to the storage of video signals, and is more particularly concerned with apparatus for storing a video signal in which the signal is compressed before it is stored.

2. Description of the Prior Art

Compression of video signals on an intra-image basis (for example, compression on an intra-field or intra-frame basis) makes use of the redundancy present in pictures or images represented by the signals to reduce the amount of information needed to represent the pictures or images. The compression can be used to reduce bandwidth, in the case of transmission of a video signal, or to reduce storage capacity, in the case of storage of a video signal.

Intra-image compression can, as is known, be effected in the time domain by the use of differential pulse code modulation, in which a predictor is used to predict the values of samples representing pixels based on previous pixel values. Since the image pixels are highly correlated, the prediction is accurate and results in a small and uncorrelated error (that is, a difference between the predicted and actual values). The error samples are encoded and, since they can be encoded using fewer bits than the samples representing the original pixels, compression can be achieved.

FIG. 1 of the accompanying drawings shows a known apparatus or system for effecting intra-image compression of a video signal in the two-dimensional spatial frequency domain. A video signal, which is in digital form and comprises successive multi-bit (for example 8-bit) samples or words each representing a respective pixel of an scanned image or picture, is applied via an input 10 to a decorrelator 12. A decorrelated version of the video signal is outputted by the decorrelator 12 to a quantizer 14 and then to an entropy encoder 16, which together compress the decorrelated version of the video signal outputted by the decorrelator 12 to produce a compressed signal on an output 18. The compressed signal can then be transmitted or stored. (Note that, although the decorrelator 12, quantizer 14 and entropy encoder 16 are shown for clarity as being separate items, they may in practice be embodied in an at least partially combined form.) After transmission or storage, the compressed signal can be restored substantially to its original form by expansion by way of entropy decoding, dequantizing and correlation operations which employ parameters converse to those used for decorrelation, quantization and entropy encoding, respectively, upon compression.

The operation of decorrelation performed in the decorrelator 12 relies upon the fact that neighboring pixels of an image are highly correlated, whereby processing an image (for example, a field or frame of a video signal) to form decorrelated signal portions representing different components of the image in the two-dimensional spatial frequency domain enables a reduction in the amount of information needed to represent the image. Specifically, the decorrelated signal portions represent different spatial frequency components of the image to which the human psychovisual system has respective different sensitivities. The different decorrelated signal portions are subjected to different degrees of quantization in the quantizer 14, the degree of quantization for each signal portion depending upon the sensitivity of the human psychovisual system to the information in that portion. That is, each of the decorrelated signals is quantized in accordance with its relative importance to the human psychovisual system. This selective quantization operation, which is a lossy operation in that it involves deliberate discarding of some frequency data considered to be redundant or of little importance to adequate perception of the image by the human psychovisual system, in itself enables some signal compression to be achieved. The quantizer 14 enables compression to be achieved in two ways: it reduces the number of levels to which the data inputted to it can be assigned, and it increases the probability of runs of zero value samples on the data it outputs. Note that, in video signal compression apparatus described in detail below, the ability to achieve signal compression provided by the operation of the quantizer 14 is not used to produce a bit (data) rate reduction in the quantizer itself. Instead, in that case, the ability to achieve signal compression provided by the operation of the quantizer is carried into effect in the entropy encoder 16 in that the reduction in information content achieved in the quantizer 14 enables a consequential bit (data) rate reduction to be achieved in the entropy encoder.

Further (non-lossy) compression, and bit (data) rate reduction, is provided in the entropy encoder 16 in which, in known manner, using for example variable length coding, the data produced by the quantizer 14 is encoded in such a manner that more probable (more frequently occurring) items of data produce shorter output bit sequences than less probable (less frequently occurring) ones. In this regard, the decorrelation operation has the effect of changing the probability distribution of the occurrence of any particular signal level, which is substantially the same as between the different possible levels before decorrelation, into a form in which in which it is much more probable that certain levels will occur than others.

The compression/coding system or apparatus as shown in FIG. 1 can be embodied in a variety of ways, using different forms of decorrelation. An increasingly popular form of implementation makes use of so-called transform coding, and in particular the form of transform known as the discrete cosine transform (DCT). (The use of DCT for decorrelation is in fact prescribed in a version of the compression system of FIG. 1 described in a proposed standard prepared by JPEG (Joint Photographic Experts Group) and currently under review by the ISO (International Standards Organization).) According to the transform technique of decorrelation, the signal is subjected to a liner transform (decorrelation) operation prior to quantization and encoding. A disadvantage of the transform technique is that, although the whole image (for example, a whole field) should be transformed, this is impractical in view of the amount of data involved. The image (field) thus has to be divided into blocks (for example, of 8×8 samples representing respective pixels), each of which is transformed. That is, transform coding is complex and can be used on a block-by-block basis only.

A recently proposed approach to compression/coding in the frequency domain is that of sub-band coding. In this approach, the decorrelator 12 in the system of FIG. 1 would comprise a spatial (two-dimensional) sub-band filtering arrangement (described in fuller detail below) which divides the input video signal into a plurality of uncorrelated sub-bands each containing the spatial frequency content of the image in a respective one of a plurality of areas of a two-dimensional frequency plane of the image, the sub-bands then being selectively quantized by the quantizer 14 in accordance with their positions in the sensitivity spectrum of the human psychovisual system. That is, decorrelation is achieved in this case by putting the energy of the overall image into different sub-bands of the two-dimensional spatial frequency domain. Sub-band filtering is believed to provide better decorrelation than the transform approach. Also, unlike the transform technique, there is no restriction to operation on a block-by-block basis: the sub-band filtering can be applied directly to the video signal.

OBJECTS AND SUMMARY OF THE INVENTION

An object of the invention is to provide a video signal recording apparatus in which the signal is efficiently compressed prior to recordal.

Another object of the invention is to provide a video signal recording apparatus in which the signal is compressed prior to recordal, and in which subjective degradation of picture (image) quality as a result of compression and storage (and subsequent reproduction and expansion) is minimized.

A further object of the invention is to provide a video signal recording apparatus with signal compression in which error correction encoding is applied to the signal prior to recordal in such a manner that information in the signal of greater subjective importance to the human psychovisual system is subjected to a more robust form of error correction encoding.

Yet another object of the invention is to provide a video signal recording apparatus with signal compression in which error correction encoding is applied to the signal prior to recordal in such a manner that the probability of successful data recovery in shuttle is enhanced.

Still a further object of the invention is to provide a video signal recording apparatus with signal compression which records a signal such that a recognizable picture can be viewed while data is being recovered in shuttle.

The invention provides apparatus for storing a video signal. The apparatus comprises signal compression means constituted by a spatial two-dimensional sub-band filtering arrangement that filters a digital video signal to form a plurality of data sets constituting respective sub-bands of the two-dimensional spatial frequency domain, a quantizer that quantizes the data sets in accordance with respective values, the values being such that the amount of quantization of one of the data sets constituting a sub-band to which dc luminance information of the signal is at least predominantly confined is less than the average of the amounts of quantization of the remaining data sets, and an entropy encoder that encodes at least some of the quantized data sets. The signal compression means is followed by storage means for storing the compressed video signal.

In such apparatus, the signal is subjected, before storage, to an efficient and frequency-selective form of compression involving spatial two-dimensional sub-band filtering. In this regard, the fact that the data set constituting the sub-band to which the dc luminance information of the signal is at least predominantly confined is quantized less than the average of the remaining data sets means that there is less loss of information in that part of the two-dimensional spatial frequency spectrum that is of greatest importance to satisfactory appreciation of the image represented by the signal by the human psychovisual system. Thus, subjective degradation of picture (image) quality as a result of compression and storage, and subsequent reproduction and expansion, is minimized.

The storage means may be of a variety of forms, for example magnetic tape storage means (in which case the apparatus may be in the form of a video tape recorder with compression), magnetic disk storage means, or random access memory storage means (RAM recorder).

Preferably, the apparatus includes error correction coding means operative to effect error correction encoding of the signal before it is stored in the storage means. In this way, errors which occur on reproduction, particularly in the case when the storage means is a magnetic tape storage means, can be minimized. Accordingly, degradation of picture quality as a result of compression and storage, and subsequent reproduction and expansion, is further minimized.

The error correction coding means may be operative to provide different error correction encoding as between different portions of the signal each derived from a respective one or more of said data sets. This feature provides the advantage that different sub-bands may in effect be subjected to different levels or types of error correction as may be considered appropriate in accordance with their respective information contents. For instance, the error correction coding means may be operative to provide more robust error correction encoding to a portion of the signal derived from said data set constituting the sub-band to which the dc luminance information of the signal is at least predominantly confined than to at least part of the remainder of the signal. This feature provides that, in general in the case of reproduction, the dc luminance sub-band (of most importance to the human psychovisual system) is given special attention from the standpoint of error correction so as even further to minimize degradation of picture quality as a result of compression and storage, and subsequent reproduction and expansion. Further, in the specific case of reproducing and expanding data in a shuttle (high speed reproduction) mode, this feature provides the further advantage that the probability of successful data recovery is enhanced.

As is well known, a color video signal can be in component or composite form. A component color video signal comprises three separate signals which together represent the totality of the video information. The three separate signals may, for example, be a luminance signal and two color difference signals (Y, Cr, Cb) or three signals each representing a respective color (R, G, B). A composite color video signal, on the other hand, is a single signal comprising all the luminance and chrominance (color) information.

Previously proposed color video signal compression systems as described above all operate on component signals only. That is, taking the example of the system of FIG. 1, three separate systems as shown in FIG. 1 are needed, one for each of the three components. Also, if the signal is in composite form, there is a need for means to convert it into component form prior to compression. Further, three expansion systems are needed to convert the transmitted or stored signals back to their original form, together with (if appropriate) means to convert the component signals back into composite form. The need to process the video signal in component form thus involves the expense and inconvenience of considerable hardware replication.

While the invention is applicable in the case of component (or monochrome) video signals, a preferred feature of the invention is that it can be used also to compress and store composite color video signals. This preferred feature takes advantage of a realization by the inventors that, due to the way in which luminance and chrominance information are combined in conventional broadcast standard (for example, NTSC and PAL) composite color video signals, such a signal can be spatially sub-band filtered such that the chrominance information can be (as is explained in detail below) concentrated in a certain area of the two-dimensional spatial frequency domain (that is, in certain of the sub-bands), whereby, if the data sets to which the dc chrominance information and dc luminance information are at least predominantly confined are quantized more lightly than the other data sets (which contain wholly or largely only the ac luminance information) are on average quantized, then since the dc information is more important to satisfactory appreciation of the image by the human psychovisual system than the ac luminance information it is in fact (surprisingly) possible satisfactorily to compress a composite color video signal directly, that is without first converting it to component form and compressing each component individually.

In the case in which, in order to enable compression of a digital composite color signal, the quantizer is operative to quantize said data sets in accordance with respective values which are such that the amounts of quantization of each of the said data sets constituting the sub-bands to which the dc luminance information and the dc chrominance information of the signal is at least predominantly confined are less than the average of the amounts of quantization of the other data sets, the error correction coding means is preferably operative to provide more robust error correction encoding to portions of the signal derived from said data set constituting the sub-band to which the dc luminance information of the signal is at least predominantly confined and from said data sets constituting the sub-bands to which the dc chrominance information of the signal is at least predominantly confined than to the remainder of the signal. Thus, there is a relatively smaller probability of degradation of these relatively important sub-bands.

The storage means may be operative to record the compressed video signal on a magnetic storage medium, and storage control means may be provided to cause a portion of the compressed signal derived from said data set constituting the sub-band to which the dc luminance information of the signal is at least predominantly confined to be recorded on the storage medium differently than the remainder of the compressed signal. For example, in an embodiment disclosed hereinbelow, the storage means is operative to record the compressed video signal in slanting tracks on a magnetic tape, and storage control means is provided to cause a portion of the compressed signal derived from said data set constituting the sub-band to which the dc luminance information of the signal is at least predominantly confined to be recorded on said tracks differently than the remainder of the compressed signal. The fact that the data set constituting the sub-band to which the dc luminance information of the signal is at least predominantly confined is recorded differently than the remainder of the compressed signal data sets leads to the advantage that the dc sub-band can be so recorded as to improve the probability of data recovery in shuttle.

The different recording of the portion of the compressed signal derived from the data set constituting the sub-band to which the dc luminance information of the signal is at least predominantly confined can be effected in several ways. For instance, the storage control means may be operative to cause said portion of the compressed signal derived from said data set constituting the sub-band to which the dc luminance information of the signal is at least predominantly confined to be recorded at predetermined positions along (for example at the centers of) at least some of said tracks. If this is done, and if the locus of travel of a reproducing head used in reproduction is synchronized with respect to the tracks so that, in shuttle, the locus crosses the predetermined track positions, at least the dc luminance sub-band, which contains enough of the picture information to enable the picture to be recognized, can be recovered in shuttle to enable the tape position to be monitored during shuttle movement.

Additionally or alternatively, the different recording of the portion of the compressed signal derived from the data set constituting the sub-band to which the dc luminance information of the signal is at least predominantly confined can be effected in that the storage control means is operative to cause said portion of the compressed signal derived from said data set constituting the sub-band to which the dc luminance information of the signal is at least predominantly confined to be recorded at least twice.

BRIEF DESCRIPTION OF THE DRAWINGS

The above, and other objects, features and advantages of the invention will be apparent from the following detailed description of illustrative embodiments thereof, which is to be read in conjunction with the accompanying drawings, in which like references indicate like items throughout, and in which:

FIG. 6 is a graph representing the response of the human psychovisual system to different spatial frequencies;

FIG. 7 represents a quantization matrix that would be used in a quantizer of the video signal compression apparatus if a sub-band filtered component (luminance) video signal were being processed in the quantizer, and shows also respective modifications to be made if, instead, a sub-band filtered composite video signal (NTSC or PAL) were being processed in the quantizer;

DESCRIPTION OF THE PREFERRED EMBODIMENTS

An apparatus for compressing a digital video signal will now be described with reference to the drawings. The basic construction of the apparatus is in accordance with FIG. 1 (described above). The decorrelator 12 of the present apparatus is constituted by a sub-band filtering arrangement which, according to one form of implementation as shown in outline form at 12A in FIG. 2, comprises a horizontal filter arrangement 20A, an intermediate field store 22, a transpose sequencer (address generator) 24, a vertical filter arrangement 26A, an output field store (FS) 28 and an output sequencer (address generator) 29A. As explained above, sub-band filtering can be effected on a separable basis. Thus, in FIG. 2, filtering in the two orthogonal image directions, namely the horizontal direction (the direction of image scanning in the case of conventional video) and the vertical direction, is effected entirely independently and separately of one another by respective one-dimensional filtering operations performed in the horizontal and vertical filter arrangements 20A and 26A, respectively.

The horizontal filter arrangement 20A and vertical filter arrangement 26A can be of substantially the same construction as one another. Thus, the construction of the horizontal filter arrangement 20A only will be described in detail.

It will be assumed that the filtering is to achieve 8 sub-bands in each of the horizontal and vertical directions, that is to say that a square array of 64 (8×8) sub-bands is to be produced. It will further be assumed that the 64 sub-bands are (as is preferred) to be of equal extent to one another.

Figure 3:
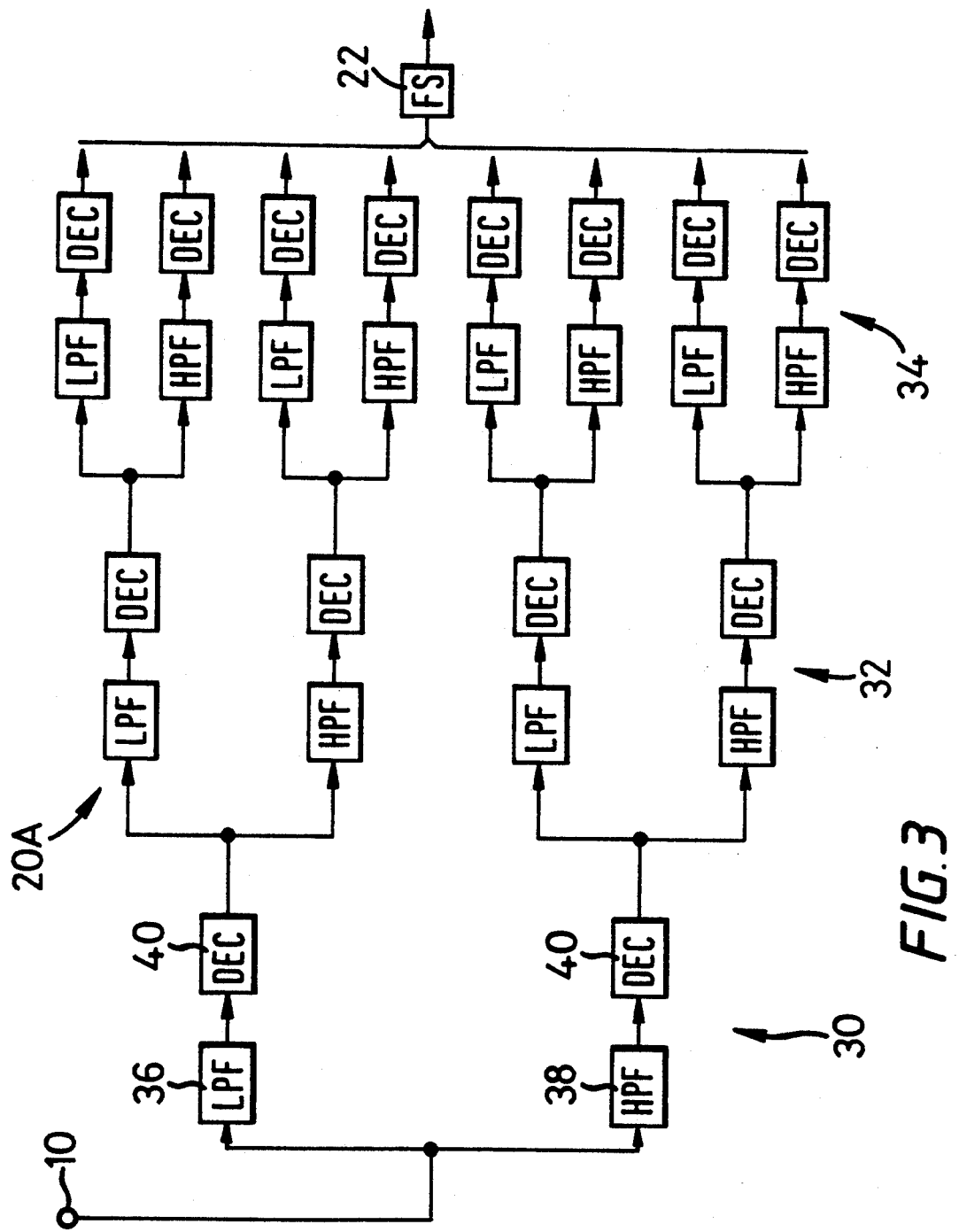
FIG. 3 is a detailed block diagram of a horizontal filter arrangement forming part of the sub-band filtering arrangement shown in FIG. 2.

The horizontal filter arrangement 20A is preferably of a tree or hierarchical structure as shown in FIG. 3, comprising three successive filter stages 30, 32 and 34.

The first stage 30 comprises a low pass filter (LPF) 36 and a high pass filter (HPF) 38, each of which is followed by a respective decimator (DEC) 40. The LPF filter 36, HPF filter 38 and the decimators 40 together make up a quadrature mirror filter (QMF). Each of the filters 36 and 38 can be a finite impulse response (FIR) filter of conventional form. In use, a line of a field of the input digital video signal is applied, sample-by-sample, to the first stage 30, to be low pass filtered and high pass filtered by the LPF 36 and HPF 38, respectively. Thus, the LPF 36 and HPF 38 produce outputs comprising low pass filtered and high pass filtered versions of the input line, respectively, the outputs representing the spatial frequency content of the line in the upper and lower halves of the horizontal spatial frequency range. That is, the first stage 30 divides the input line into two sub-bands in the horizontal direction. The decimators 40 decimate (sub-sample) the respective outputs by a factor of two, whereby the total number of samples outputted by the decimators 40 (together) is the same as the total number of samples in the line.

The second stage 32 is of similar construction to the first stage 30, except that there are two QMFs each as in the first stage and the output from each of the decimators 40 of the first stage is passed as an input to a respective one of the two QMFs. Thus, the second stage 32 produces four outputs representing the spatial frequency content of the line in four equal quarters of the horizontal spatial frequency range. That is, the second stage 32 further divides the two sub-bands, into which the input line was divided in the first stage 30, into four sub-bands in the horizontal direction. The four decimators of the second stage 32 decimate (sub-sample) the respective outputs by a factor of two, whereby the total number of samples outputted by the decimators of the second stage (together) is the same as the total number of samples in the line.

The third stage 34 is of similar construction to the first stage 30, except that there are four QMFs each as in the first stage and the output from each of the four decimators of the second stage 32 is passed as an input to a respective one of the four QMFs. Thus, the third stage 34 produces eight outputs representing the spatial frequency content of the line in eight equal one-eighths of the horizontal spatial frequency range. That is, the third stage 34 divides the four sub-bands into which the input line was previously divided into the required eight sub-bands in the horizontal direction. The eight decimators of the third stage 34 decimate (sub-sample) the respective outputs by a factor of two, whereby the total number of samples outputted by the decimators of the third stage (together) is the same as the total number of samples in the line.

The eight outputs of the third stage 34, that is of the horizontal filter arrangement 20A, are passed to the intermediate field store 22 and stored at positions corresponding to respective one-eighths of a first line thereof. The above process of horizontal filtering is then repeated for all the other lines of the field of the input digital video signal. This results in the intermediate field store 22 containing a version of the field of the input digital video signal that has been filtered into eight sub-bands in the horizontal direction (only). Each line of the field stored in the intermediate field store 22 is divided into eight portions each containing the horizontal spatial frequency information in a respective one of eight sub-bands of the horizontal spatial frequency range of the image that the original field represented. Thus, the horizontally filtered field stored in the intermediate field store 22 can be considered to be divided into eight columns.

Referring back to FIG. 2, the horizontally filtered field stored in the intermediate field store 22 is then fed (under the control of the transpose sequencer 24) into the vertical filter arrangement 26A, in which it is filtered into eight sub-bands in the vertical direction in similar manner to that in which filtering into eight sub-bands in the horizontal direction was achieved in the horizontal filter arrangement 20A. The horizontally and vertically filtered field is fed on a line-by-line basis into the output field store 28 to be passed from there to a quantizer 14A. The store 28 can be considered to have been partitioned into an array of 64 (8×8) storage regions, in each of which a respective one of the 64 sub-bands is stored. Thus, successive fields of the input digital video signal are sub-band filtered and passed, duly filtered, to the quantizer 14A after a delay of two field intervals.

The transpose sequencer 24 produces read addresses for the intermediate field store 22, to control reading of the contents thereof into the vertical filter arrangement 26A, as follows. As will be recalled, the signal as stored in the intermediate field store 22 comprises the lines of the original field, each divided horizontally into eight sub-bands. That is, the signal as stored in the intermediate field store 22 can, as mentioned above, be considered to comprise eight columns. To enable the signal stored in the intermediate field store 22 to be vertically filtered by hardware of the same construction (the vertical filter arrangement 26A) used to horizontally filter it, it must be transposed, that is rotated through 90 degrees, as it is read to the vertical filter arrangement 26A, so that is comprises eight rows (as opposed to columns). The transpose sequencer 24 addresses the intermediate field store 22 in such a manner as to accomplish this.

Figure 4:
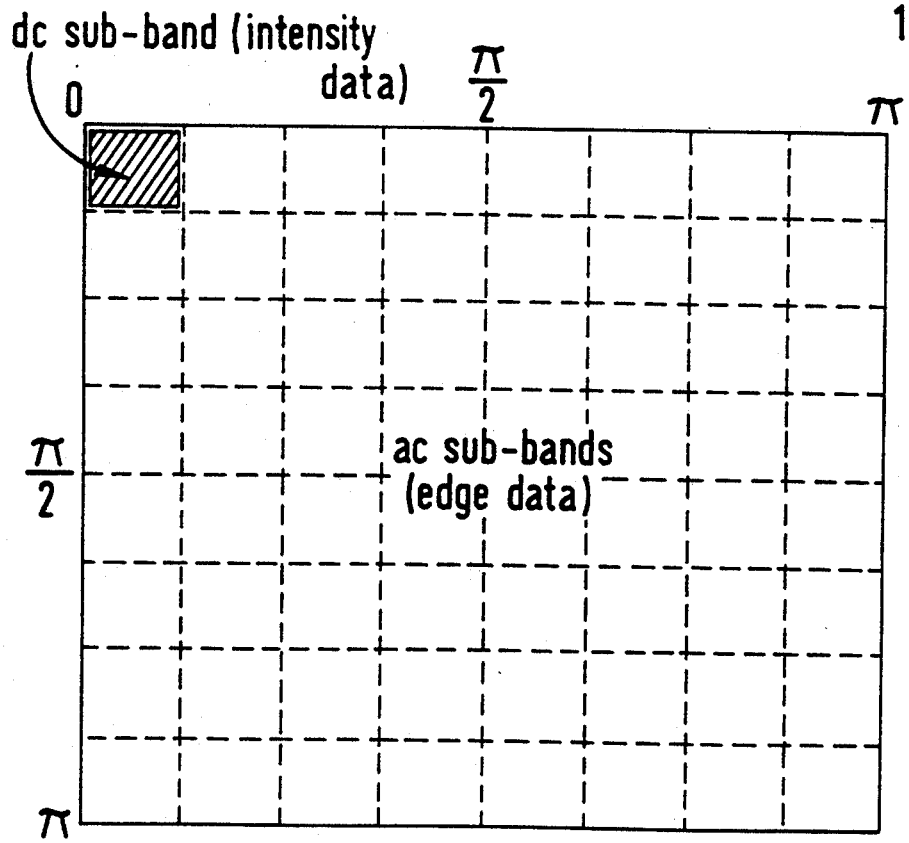
FIG. 4 shows a sub-band filtered field of a video signal (luminance only) on a two-dimensional frequency plane.

The horizontally and vertically filtered field stored in the output field store 28, which has been sub-band filtered by a factor of eight in both directions, can thus be considered as having been divided into eight rows and eight columns, that is into an 8×8 sub-band array. The horizontally and vertically sub-band filtered field, as stored in the output field store 28 of the sub-band filtering arrangement 12 ready for quantization, can be represented (subject to the qualification mentioned below concerning sub-band scrambling) on a two-dimensional frequency plane as shown in FIG. 4. In conventional manner for considering image (two-dimensional) signals, frequency is represented in normalized form in FIG. 4, the symbol pi being equivalent to half the Nyquist limit sampling frequency. For the time being, it is assumed that the input digital video signal is a component (luminance) signal, or even a monochrome signal, rather than a composite signal. Thus, the 64 sub-bands comprise a single sub-band, referred to hereinafter as the dc (zero spatial frequency) sub-band, which contains most or all of the dc information image intensity data, namely the sub-band (shown shaded) in the upper left hand corner of FIG. 4, together with 63 ac sub-bands which contain edge data, that is components of the two-dimensional frequency spectrum of the image in respective sub-bands higher than dc (zero spatial frequency). In this regard, if the filtered signal in the output field store 28 were viewed on a monitor, it would be intelligible. Thus, a very heavily filtered version of the original signal would be seen in the upper left hand corner picture area (dc sub-band) and higher frequency components could be observed in the other 63 picture areas (ac sub-bands).

The sub-band filtering arrangement structure described above with reference to FIG. 3 (unlike an alternative arrangement described below with reference to FIG. 5), because of its hierarchical QMF structure, "scrambles" the order or sequence of the sub-bands. That is, due to a frequency inversion that takes place in each of the QMFs, if a field of the filtered signal in the output field store 28 were viewed on a monitor, there would not be a one-to-one correspondence between the field as viewed and the showing of FIG. 4. Thus, while the dc sub-band would remain in the upper left-hand corner, the frequency plane locations of the 63 ac sub-bands would be different from (that is, scrambled with respect to) their locations in FIG. 4. The locations would of course be the same for successive fields and can readily be determined from the structure of FIG. 3. In other words, while each of the 64 storage regions into which the store 28 is partitioned stores a respective one of the 64 sub-bands, the relative positioning of the 63 storage regions containing the ac sub-bands is scrambled (in a known manner) with respect to the relative positioning of the ac sub-bands as shown in FIG. 4.

In order that the scrambled locations of the 63 ac sub-bands are descrambled (that is, put into the pattern shown in FIG. 4) before the sub-band filtered signal is passed to the quantizer 14A, the output sequencer 29A (which can be located, as shown, in the sub-band filtering arrangement 12A, though it could be located elsewhere, for example in the quantizer 14A), which is connected to the output field store 28 to produce read addresses therefor to cause the data therein to be read out to the quantizer 14A, is so designed that the data is read out in a descrambled manner, that is in such a manner that the sub-bands as supplied to the quantizer conform to FIG. 4. (The operation of the sequencer 29A in this regard is described in more detail below with reference to FIGS. 9 and 10.)

Figure 5:
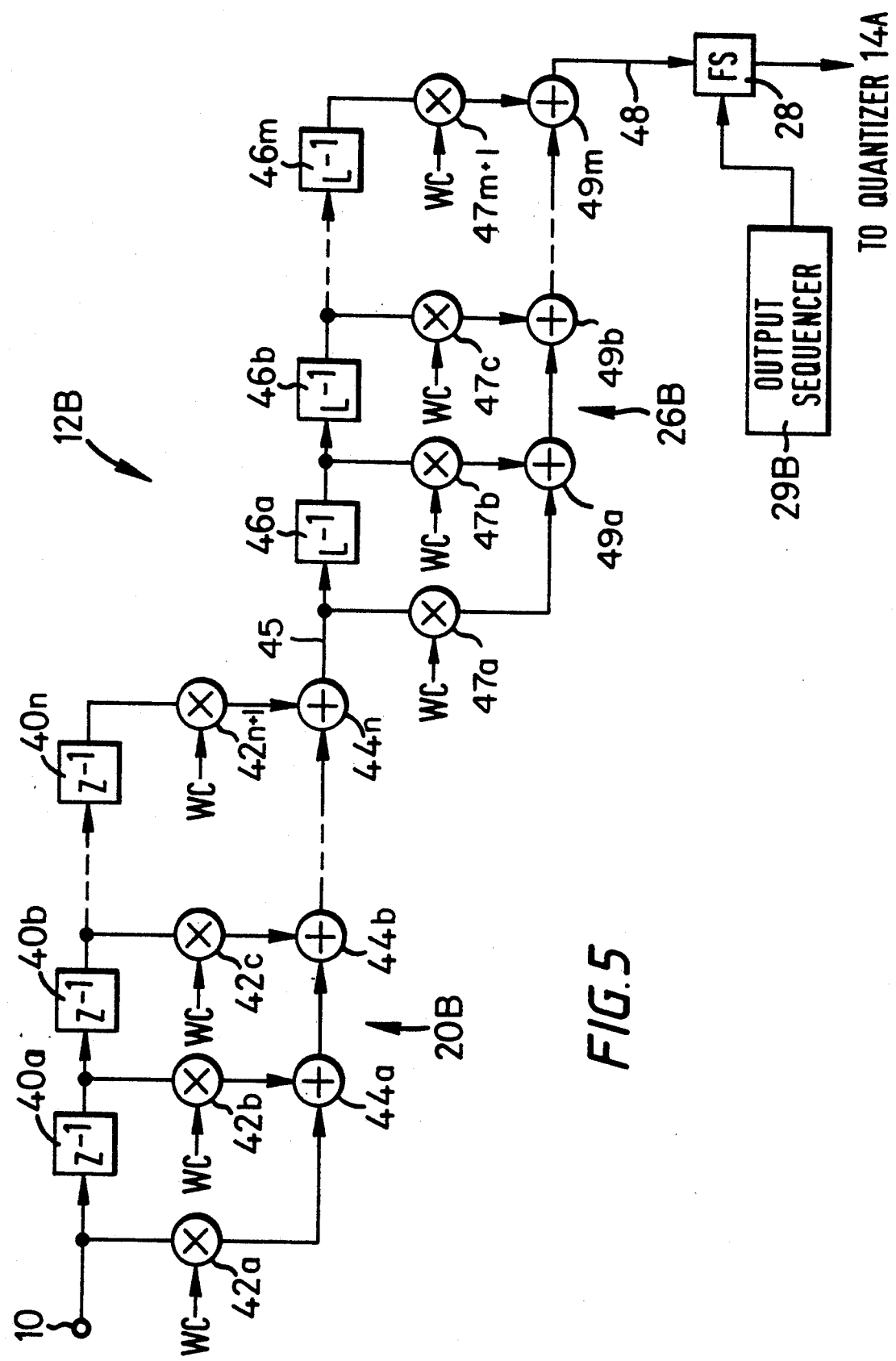
FIG. 5 is a block diagram of another form of implementation of a decorrelator, in the form of a sub-band filtering arrangement, for use in the video signal compression apparatus.

FIG. 5 shows at 12B a form of implementation of the sub-band filtering arrangement which can be used instead of that (12A) described above with reference to FIGS. 2 and 3. The sub-band filtering arrangement 12B comprises a horizontal filter arrangement 20B, a vertical filter arrangement 26B, an output field store 28, and an output sequencer 29B. As in the case of the sub-band filtering arrangement 12A of FIGS. 2 and 3, filtering in the horizontal and vertical directions is in this case also effected entirely separately of one another, namely by respective one-dimensional filtering operations performed in the horizontal and vertical filter arrangements 20B and 26B, respectively.

The horizontal filter arrangement 20B is of a conventional FIR structure, comprising a chain of an appropriate number of one-sample delay elements 40a, 40b, ... 40n tapped off to multipliers 42a, 42b, ... 42n+1 (supplied with respective appropriate weighting coefficients WC) whose output signals are summed by adders 44a, 44b, ... 44n; to produce a horizontally sub-band filtered output signal 45 at the output of the final adder. Similarly, the vertical filter arrangement 26B is of a conventional FIR structure, comprising a chain of an appropriate number of one-line delay elements 46a, 46b, ... 46m tapped off to multipliers 47a, 47b, ... 47m+1 (supplied with respective appropriate weighting coefficients WC)

whose output signals are summed by adders 49a, 49b, 49m to produce a horizontally and vertically sub-band filtered output signal 48 at the output of the final adder, which signal is stored on a field-by-field basis in the output field store 28. The output sequencer 29B (which can be located, as shown, in the sub-band filtering arrangement 12B, though it could be located elsewhere, for example in the quantizer 14A), is connected to the output field store 28 to produce read addresses therefor to cause the data therein to be read out to the quantizer 14A.

Figure 2:
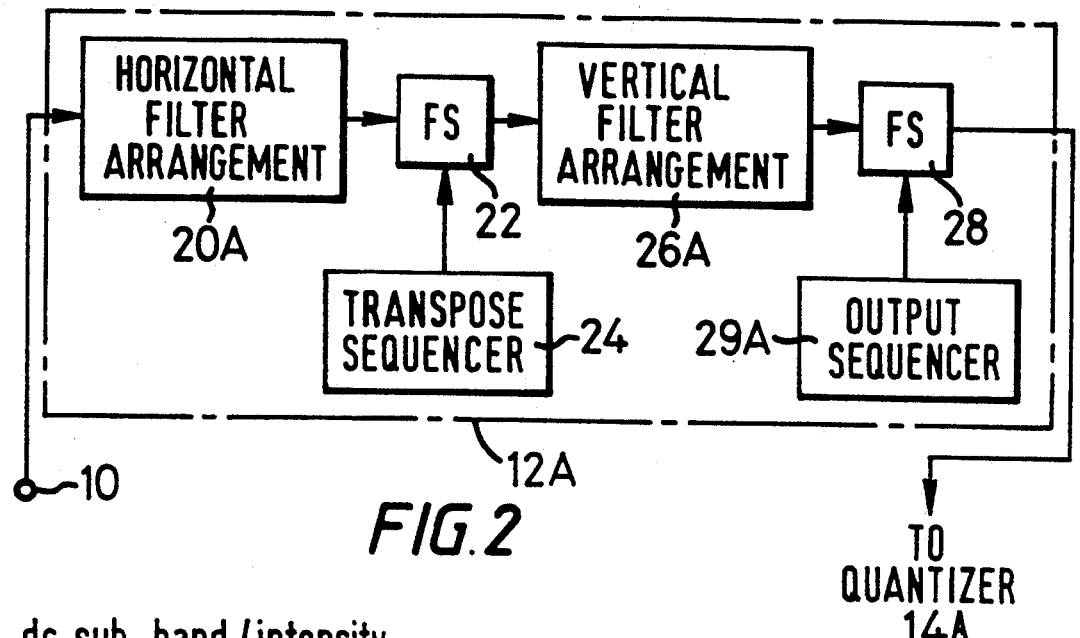
FIG. 2 is a block diagram of one form of implementation of a decorrelator, in the form of a sub-band filtering arrangement, for use in the video signal compression apparatus.

It should be noted that the intermediate field store 22 and the transpose sequencer 24 used in the sub-band filtering arrangement 12A of FIGS. 2 and 3 are not necessary when the sub-band filtering arrangement 12B of FIG. 5 is used. It should however be noted that the above-described sub-band frequency scrambling that occurs in the sub-band filtering arrangement 12B of FIGS. 2 and 3 also takes place in the sub-band filtering arrangement 12B of FIG. 5. Thus, the output sequencer 29B of the sub-band filtering arrangement 12B of FIG. 5 has to perform descrambling.

Before the quantizer 14A is described in more detail, the principle on which it operates will be explained with reference to FIGS. 6 and 7. FIG. 6 is a graph representing an empirically determined equation approximately representing the response of the human psychovisual system to different spatial frequencies, the vertical axis representing the sensitivity of the human psychovisual system, the horizontal axis representing spatial frequency, and the frequency value fs representing the Nyquist limit sampling frequency. As can be seen from FIG. 6, the human psychovisual system is most sensitive to lower frequencies, peaking at a value just above dc (zero spatial frequency), and the sensitivity rapidly drops as the frequency increases. It is therefore readily possible for the quantizer 14A to achieve compression of the sub-band filtered video signal by selectively removing information, in conformity with the graph of FIG. 6 (possibly also taking into account the amount of aliasing introduced into each sub-band by the sub-band filtering), to which the human phychovisual system is effectively insensitive. This is done by quantizing the 64 sub-bands of the sub-band filtered video signal by respective appropriate amounts. Specifically, it is assumed that circular symmetry extends the (one-dimensional) response curve of FIG. 6 to two dimensions. (This assumption is believed justified in that the human psychovisual system is less sensitive to diagonal frequencies than to horizontal and vertical frequencies.) The resultant generated surface is then integrated under each of the 64 sub-band regions to produce an array of 64 numbers (values) which act as thresholds for the purpose of quantization of respective ones of the sub-bands in the quantizer 14A. As will be evident, the numbers determine the extent of quantization for their respective sub-bands. If, as in the example described below, the numbers are used to achieve quantization by virtue of their being used to divide data arriving from the sub-band filtering arrangement 12A or 12B, then the greater the number, the greater the quantization threshold and the greater the probability of a sample in the relevant sub-band having a zero or near zero value after quantization.

It should be appreciated that the above-described technique of establishing the 64 numbers to be used for quantizing the different sub-bands represents one possible approach only and, even if this approach is used, the numbers derived by the somewhat theoretical method described above may be modified. In more detail, the quality or viewer-acceptability of a picture represented by a video signal which has been compressed by the present (or any other) technique and thereafter expanded by a converse technique is, in the final analysis, a matter of subjective opinion. Thus, a final determination of the numbers to used for quantizing the different sub-bands might well best be achieved by selecting rough initial or starting point values by the theoretical method described above and then refining those initial values by viewer testing (trial and error) to produce values judged subjectively to be optimum.

The above-described 64 numbers can be stored in the form of a quantization matrix (naturally an $8 \times 8$ matrix in the case of an $8 \times 8$ sub-band filtered signal), for example in a look-up table in a programmable read only memory (PROM). FIG. 7 shows an example of an $8 \times 8$ quantization matrix produced for a particular design of sub-band filtering arrangement. The positioning of the numbers in the matrix of FIG. 7 corresponds to the positioning of the sub-bands in FIG. 4. That is, for example, the number 68 applies to the dc sub-band and the number 8192 applies to the ac sub-band in the bottom right-hand corner in FIG. 4. It will be seen that the dc sub-band is only lightly quantized (number=68). Although the two ac sub-bands horizontally and vertically adjacent to the dc sub-band are quantized marginally even more lightly than the dc sub-band (number=64), the amount of quantization (quantization threshold) of the dc sub-band is, as can clearly be seen from FIG. 7, considerably less than the average of the amounts of quantization (quantization thresholds) of the ac sub-bands.

The following two factors must be borne in mind concerning the quantization matrix.

(a) The relative values of the numbers, rather than their absolute values, are of importance. In this regard, as explained below, the numbers in the quantization matrix may be scaled before they are used to effect quantization of the sub-bands in the quantizer 14A.

(b) Since, as mentioned above in the description of FIG. 4, it is being assumed for the time being that the input digital video signal is a component (luminance) signal, rather than a composite signal, the numbers represented in FIG. 7 apply to a component (luminance) signal. (The modifications made to the quantization matrix of FIG. 7 in the case of processing a composite signal are explained below.)

In the light of the foregoing explanation of its principle of operation, the quantizer 14A will now be described with reference to FIGS. 8 to 11.

Figure 1:
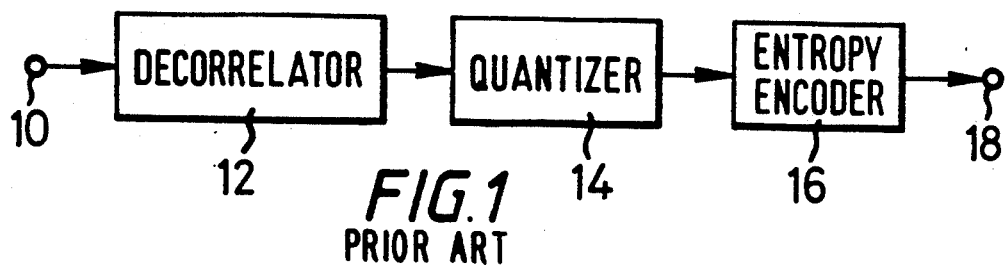
FIG. 1 shows a video signal compression apparatus or system for achieving intra-image compression of a video signal in the frequency domain.
Figure 8:
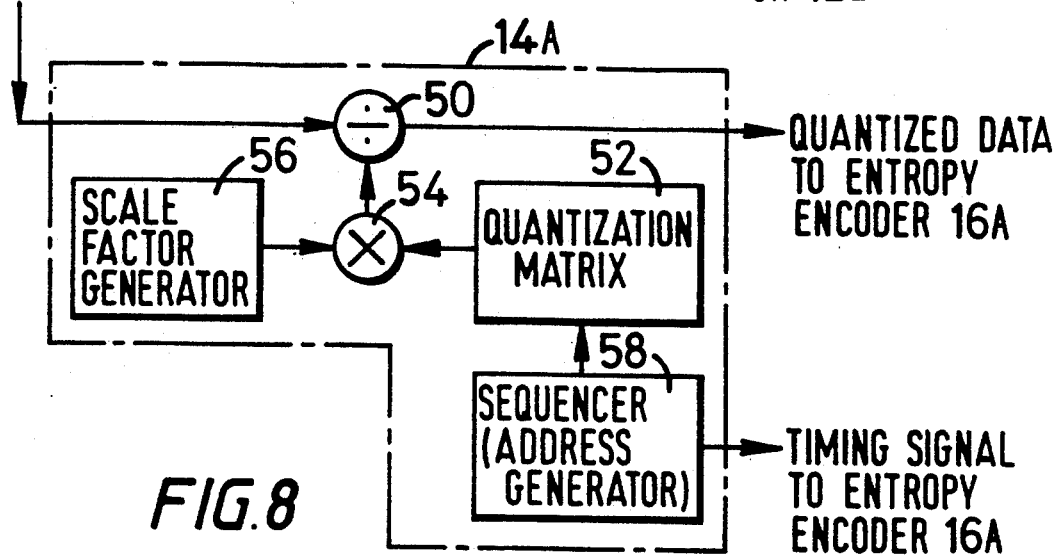
FIG. 8 is a block diagram of the quantizer.

FIG. 8 shows the quantizer 14A in block diagram form. The quantizer 14A comprises a divider 50 that receives data read thereto from the output field store 28 of the sub-band filtering arrangement 12A or 12B under the control of the output sequencer 29A or 29B, and outputs quantized data from the quantizer 14A to the entropy encoder 16 (FIG. 1).

The above-mentioned quantization matrix, referenced 52 in FIG. 8, and stored for example in a look-up table in a PROM, is connected to one input of a multiplier 54. A scale factor generator 56 is connected to another input of the multiplier 54. A sequencer (address generator) 58 is connected to the quantization matrix 52 to control it so that it outputs the appropriate one of the 64 numbers stored in the matrix at the correct time, that is so that each sample supplied to the quantizer is quantized in accordance with the sub-band in which it is located, and is connected to the entropy encoder 16A to supply thereto a timing signal that indicates to the entropy encoder whether data being supplied by the quantizer 14A to the entropy encoder results from quantization of the dc sub-band or quantization of the ac sub-bands.

The scale factor generator 56 multiplies each of the 64 numbers outputted by the quantization matrix 52 by a scale factor, whereby the samples of the stored field supplied to the quantizer 14A are divided in the divider 50 by the product of the scale factor and the number currently outputted by the quantization matrix 52. The scale factor is usually kept constant throughout the period during which the same stored field is supplied to the quantizer 14A from the sub-band filtering arrangement 12A or 12B, whereby the values for the different sub-band samples as applied by the multiplier 54 to the divider 50 maintain the same relationship relative to one another over the field as do the numbers (shown in FIG. 7) in the quantization matrix 52. However, the absolute values applied by the multiplier 54 to the divider 50 are determined by the value of the scale factor. Variation of the scale factor therefore can vary the output data (bit) rate of the entropy encoder 16A, that is of the entire compression apparatus, and can therefore be employed, for example, to keep the data rate (which can vary with image content) constant.

The quantizer 14A reads and processes a field of data stored in the output field store 28 of the sub-band filtering arrangement 12A or 12B, and passes it on after processing to the entropy encoder 16A. The processing comprises, as explained above, and as described in more detail below, a selective quantization operation used to achieve compression of the video signal. In addition, as explained below, the processing involves arrangement of the data outputted to the entropy encoder in a format that readies it for entropy encoding and bit rate reduction.

Since, in the quantizer 14A described above with reference to FIG. 8, the quantization is effected by dividing the input data (in the divider 50), the numbers (FIG. 7) in the quantization matrix 52 must be such that those for sub-bands that are to be quantized by a relatively large amount are greater than those for sub-bands that are to be quantized by a relatively small amount. Instead, the quantization could be effected by multiplying the input data (in a multiplier taking the place of the divider 50), in which case the numbers in the quantization matrix 52 would be such that those for sub-bands that are to be quantized by a relatively large amount are smaller than those for sub-bands that are to be quantized by a relatively small amount. (For example, in the latter case the numbers in the quantization matrix 52 could be reciprocals of those shown in FIG. 7.) It will be appreciated that, in both cases, the amount of quantization of the dc sub-band is considerably less than the average of the amounts of quantization of the ac sub-bands.

Figure 9:
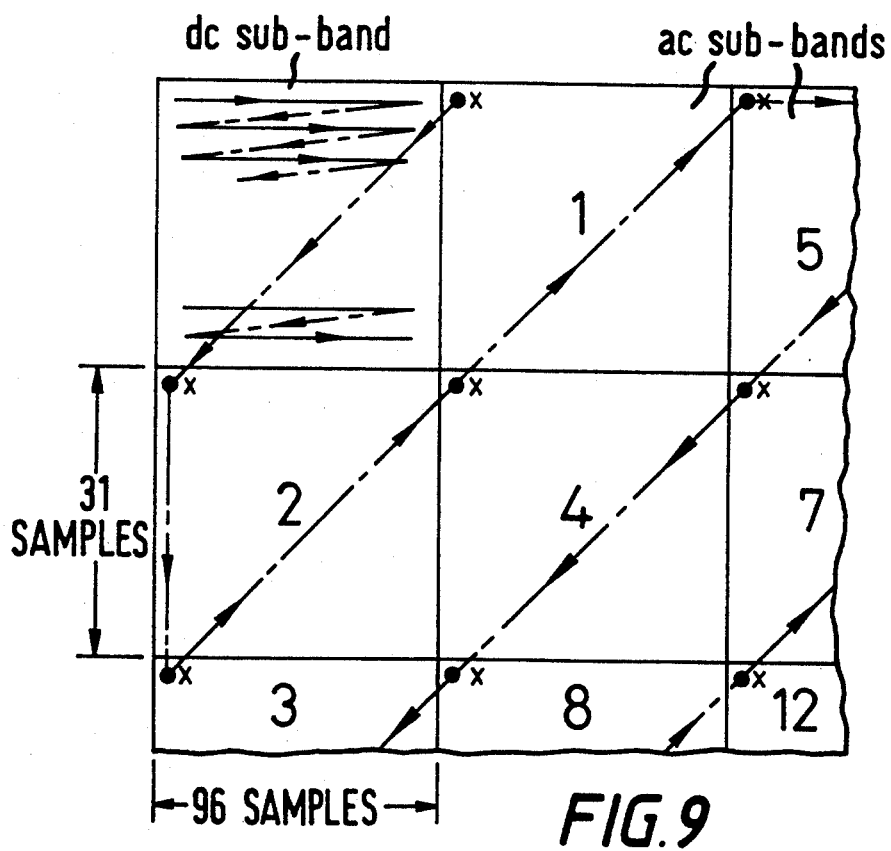
FIG. 9 shows part of FIG. 4 on an enlarged scale, and is used to explain the operation of the quantizer.

FIG. 9 shows a part (the upper left-hand corner) of FIG. 4 on an enlarged scale. More accurately, FIG. 9 is a map of a sub-band filtered field as supplied to the quantizer 14A from the output field store 28 of the sub-band filtering arrangement 12A or 12B, each sub-band being stored (as mentioned above) in a respective one of an 8×8 array of regions into which the store 28 can be considered to be partitioned. In this regard, the stored field comprises an 8×8 array of sub-bands filtered from the corresponding field of the input video signal.

A field of, for example, an NTSC digital video signal has a horizontal extent of 910 samples and a vertical extent of 262 samples. The sub-band filtering described above is however carried out on the active part only of the field, which part comprises 768 samples in the horizontal direction and 248 samples in the vertical direction. (In fact, there are 243 active samples, corresponding to the number of active lines, in the active part of an NTSC field. In order to produce numbers of active samples in both directions that are integrally divisible by 8, 5 blank lines are added to make the number of active samples in the vertical direction equal to 248.) Thus, each of the 64 sub-band areas in the active sub-band filtered field comprises (768/8)×(248/8)=2976 samples, that is an array of 96×31 samples (as shown in FIG. 9). (The whole active field comprises, of course, 64 times that number of samples.) The output sequencer 29A or 29B of the sub-band filtering arrangement 12A or 12B is operative to output the samples of the active field stored in the output field store 28 of the sub-band filtering arrangement 12A or 12B as follows.

The sequencer 29A or 29B first causes all of the 2976 samples forming the dc sub-band (the upper left-hand sub-band area in FIG. 9), namely those in that one of the 64 regions of the output store 28 of the sub-band filtering arrangement 12A or 12B containing the data constituting that sub-band, to be fed in turn to the quantizer 14A. This can be done by addressing the relevant regions of the output store 28 in an order akin to the raster scan employed to form the full active field, though in this case the area (and the number of samples) is reduced by a factor of 64 as compared to a full field. The process is represented schematically by the arrowed lines drawn in the upper left-hand sub-band area in FIG. 9. The resulting 2976 samples are supplied in turn to the divider 50. While this process is taking place, the sequencer 58 (which, though shown as a separate item, could be combined with the output sequencer 29A or 29B of the sub-band filtering arrangement 12A or 12B) causes the quantization matrix 52 to output to the multiplier 54 the number (68) for the dc sub-band. Thus, all the 2976 samples of the dc sub-band are quantized (by the same amount) by being divided in the divider 50 by the product of the number (68) for the dc sub-band and the scale factor (from the scale factor generator 56), and passed on as a run or sequence of 2976 samples to the entropy encoder 16A. Also, while the above process is taking place, the sequencer 58 causes the timing signal that it supplies to the entropy encoder 16A to be such as to indicate to the entropy encoder that the quantized samples that it is receiving relate to the dc sub-band.

When the dc sub-band samples have been processed through the quantizer 14A as just described, the sequencer 58 causes the timing signal that it supplies to the entropy encoder 16A to be such as to indicate to the entropy encoder that the quantized samples that it is about to receive relate to the ac sub-bands. Thus, the timing signal is changed once per field; that is, it has a frequency equal to the field frequency. The output sequencer 29A or 29B then causes writing to the quantizer 14A of the ac sub-band data, and the sequencer 58 causes a corresponding selection of the numbers to be outputted by the quantization matrix 52, in a manner now to be described.

The ac sub-band data is processed through the quantizer 14A in a rather different manner than the dc subband data. An operation is carried out 2976 times, under the control of the output sequencer 29A or 29B, in each of which the respective 63 samples having a respective one of the 2976 spatial positions (pixel sites) in the 63 sub-bands are passed to the divider and multiplied by their respective coefficients. This operation may be more readily understood by referring to FIG. 9.

In the first of the above-mentioned 2976 operations, as a first step the first stored sample accessed is the top left-hand one (indicated by a dot) in the ac sub-band numbered 1 in FIG. 9. That sample is divided by the product of the scale factor and the number in the quantization matrix 52 relating to that sub-band, that is the number 64: see FIG. 7. Next, as a second step, the same process is repeated for the top left-hand sample (again indicated by a dot) in the ac sub-band numbered 2 in FIG. 9, the number outputted by the quantization matrix 52 in this case being the number 64. As a third step, the process is repeated for the ac sub-band numbered 3 in FIG. 9, the number outputted by the quantization matrix 52 in this case being the number 84. The process is repeated until it has been carried out 63 times, that is for all of the 63 ac sub-bands. The order in which the sub-bands are accessed is in accordance with the sequence 1 to 63 in which the ac sub-bands are designated in FIG. 10 (and, for some only of the ac sub-bands, in FIG. 9). It will be seen from FIG. 10 that the order of processing or scanning of the ac sub-bands is a zig-zag order (shown partially by arrowed chain-dotted lines in FIG. 9 for the top left-hand samples) in that it involves scanning the ac sub-bands in a diagonal direction and in opposite senses. (Thus, the legs of the zig-zag comprise successive ones of a series of groups of the 63 ac sub-bands in a sequence as between the groups (legs of the zig-zag) of ac luminance information of increasing spatial frequency.) The above-explained zig-zag scanning technique is based upon, though considerably modified with respect to, a zig-zag scanning technique (described below) that has been proposed as part of the above-mentioned JPEG (Joint Photographic Experts Group) standard, which (rather than sub-band filtering) requires the use of DCT coding with 8×8 sample blocks, to each of which an 8×8 DCT transform is applied, as mentioned at the beginning of this description.

The remaining ones of the above-mentioned 2976 (63-step) operations are carried out in the same manner as the first one, except that, in each case, a respective different one of the 2976 sample sites is used. Thus, for example, in the second operation the samples that are processed are those having the spatial positions indicated by crosses in FIG. 9, these being those immediately to the right of those, indicated by dots, that were processed in the first of the operations.

Figure 11:
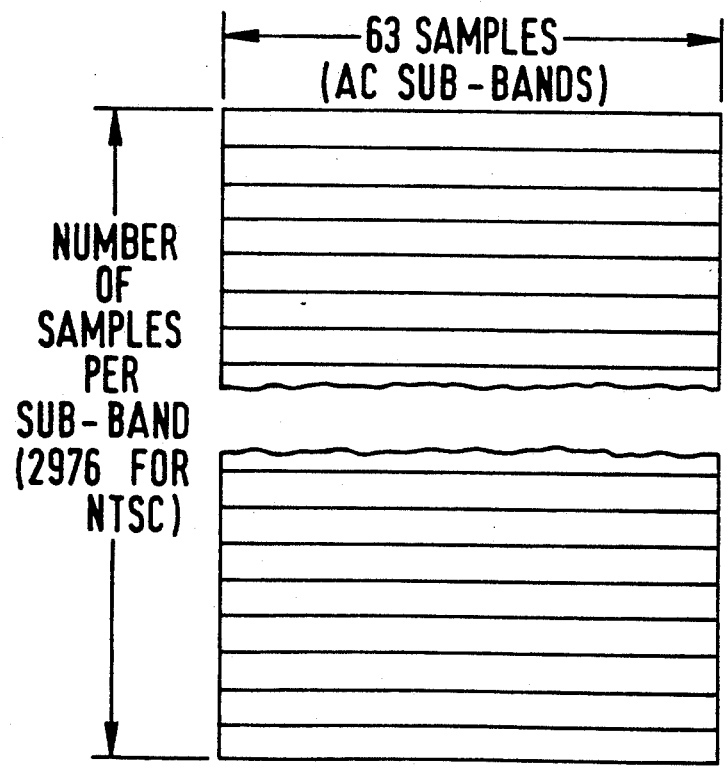
FIG. 11 shows the format of quantized data emerging from the quantizer for ac sub-bands.

It will be understood from the foregoing explanation that the data inputted to and outputted by the quantizer 14A for the ac sub-bands (only) has a format as represented in FIG. 11. That is, 2976 successive series (hereinafter referred to as "scans")—represented in FIG. 11 by horizontal strips—of 63 quantized samples are sent to the entropy encoder 16, each such scan relating to a respective one of the 2976 sub-band pixel sites and each such scan having employed the zig-zag technique of scanning the 63 ac sub-bands as described above. The total number of samples sent to the entropy encoder 16A per field (including the dc sub-band and the ac sub-bands) is the same as the number of samples in the stored sub-band filtered field written to the quantizer. However, as will be evident from the foregoing expla-nation, the data sent to the entropy encoder no longer has any resemblance to a video field.

During the writing of the dc and ac data from the field store 28 to the quantizer 14A under the control of the sequencer 29A or 29B, the sequencer 58 is operative to control the quantization matrix 52 such that each sample supplied to the quantizer is appropriately quantized. Specifically, the matrix 52 first continuously outputs the number (68) for the dc sub-band for a period having a duration of 2976 samples, and then outputs the 63 numbers for the ac sub-bands in a 63-stage sample-by-sample zig-zag manner corresponding to the manner in which the samples are written from the field store 28 to the quantizer 14A.

The aim of reducing information in the video field by the quantizing operation performed in the quantizer 14A, and therefore enabling compression to be achieved by virtue of the quantizing operation, is achieved by the division operation performed in the divider 50. Thus, particularly for the higher frequency sub-bands, and particularly for image positions that contain little ac spatial frequency information, the sample outputted by the divider 50 will have a zero or very low value, being constituted wholly or mostly by bits of the value zero. It should, however, be noted that, at least in the apparatus presently being described, no reduction in bit (data) rate is carried out in the quantizer 14A. That is, the bit length of each sample outputted by the divider 50 is the same as that of the sample inputted to it. However, the presence of long runs of zero value samples in the data outputted by the quantizer 14A, and the reduction in the number of levels to which the data inputted thereto can be assigned, enables a consequential bit rate reduction to be effected in the entropy encoder, as described below.

Figures 12, 13:
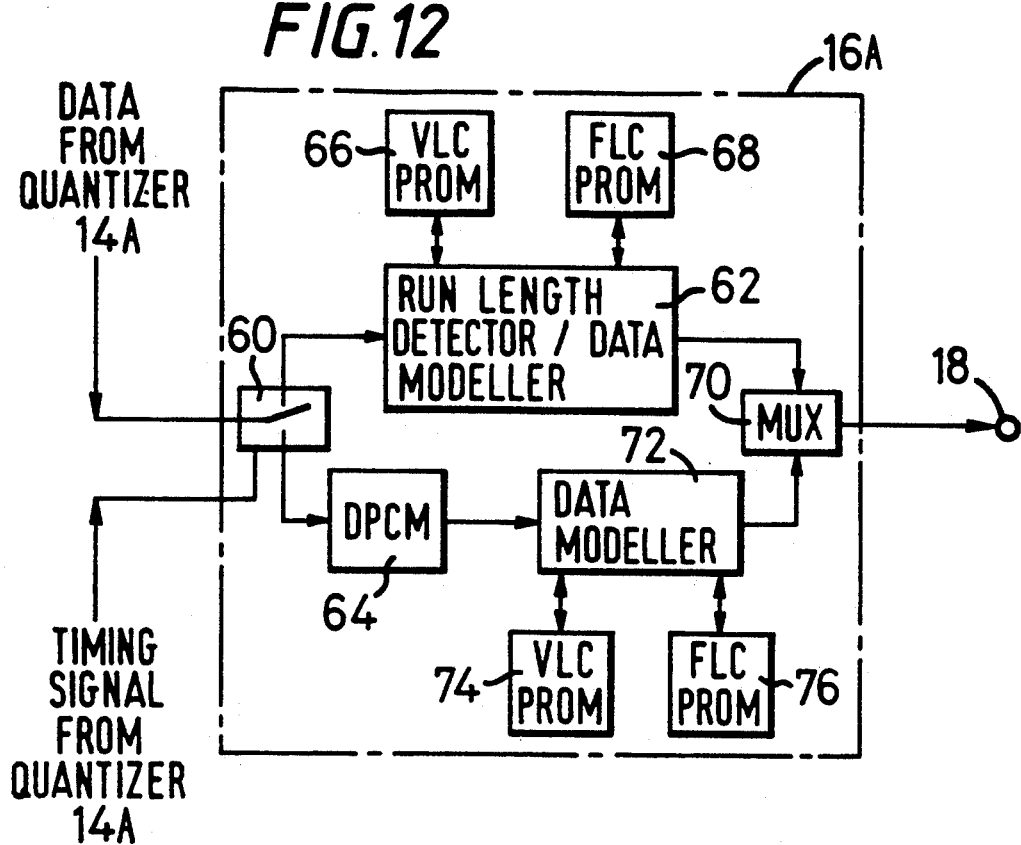
FIG. 12 is a block diagram of an entropy encoder forming part of the video signal compression apparatus.
FIG. 13 is a representation of the contents of a fixed length code look-up table forming part of the entropy encoder.

The entropy encoder 16A of the video signal compression apparatus may be embodied in the form shown in FIG. 12. The entropy encoder 16A shown in FIG. 12 complies with a so-called "baseline" version of the above-mentioned JPEG standard, which version sets out minimal requirements for complying with the standard, whereby it is in many respects of known form or based on known technology and will therefore not be described in great detail.

The entropy encoder 16A shown in FIG. 12 comprises a switch 60 controlled by the above-mentioned timing signal provided to the entropy encoder 16A by the sequencer 58 (FIG. 8) of the quantizer 14A. When the timing signal indicates that the data emerging from the quantizer 14A relates to the ac sub-bands, that is when such data is one of the 2976 successive scans (each having a length of 63 samples) represented in FIG. 11, the switch 60 directs the data to a run length detector/-data modeller 62. When, on the other hand, the timing signal indicates that the data emerging from the quantizer 14A relates to the dc sub-band, that is when such data is the run or sequence of 2976 samples of the dc sub-band preceding the 2976 successive scans represented in FIG. 11, the switch 60 directs the data to a differential pulse code modulator (DPCM) 64. The switch 60 is thus changed over once per field.

The detector/modeller 62 is connected to a PROM 66 containing a variable length code (VLC) look-up table and to a PROM 68 containing a fixed length code (FLC) look-up table. An output of the detector/-modeller 62 is connected via a multiplexer 70 to the output 18 of the apparatus.

An output of the DPCM 64 is connected to a data modeller 72, an output of which is in turn connected via the multiplexer 70 to the output 18 of the apparatus. In similar manner to the detector/modeller 62, the modeller 72 is connected to a PROM 74 containing a VLC look-up table and to a PROM 76 containing an FLC look-up table. The VLC PROMs shown at 66 and 74 may in fact be the same PROM: they are shown as being separate in FIG. 12 largely for the sake of clarity. Similarly the FLC PROMs shown at 68 and 76 may in fact be the same PROM. Further, rather than being (as shown) a separate item, the modeller 72 can be a part (sub-set) of the detector/modeller 62.

The operation of the entropy encoder 16A shown in FIG. 12 will now be described, considering first the case in which the data arriving from the quantizer 14A relates to the ac sub-bands and is therefore directed by the switch 60 to the detector/modeller 62.

The detector/modeller 62 examines each of the 2976 63-sample scans (FIG. 11) arriving from the quantizer 14A and looks for runs of consecutive zero value samples each preceded and followed by a sample of non-zero value. The detector/modeller 62 models the incoming data by converting each such run of zero consecutive value samples to a word pair of the following form:

[RUNLENGTH,SIZE][AMPLITUDE].

The two components or "nibbles" (RUNLENGTH and SIZE) of the first word of the pair each have a length of 4 bits. The bit pattern of the first nibble (RUNLENGTH) represents in binary form the number of consecutive zero value samples in the run and is generated by a counter (not shown) that counts the number of consecutive zero value samples following a previous non-zero value. (Run lengths from 0 to 15 are allowed and a runlength continuation is indicated by a code [F,0].) The bit pattern of the second nibble (SIZE) represents the number of bits to be used to indicate the amplitude of the sample of non-zero (value) amplitude that follows the consecutive run of zero value samples and is looked up from the table—represented in FIG. 13—contained in the FLC PROM 68, the left hand part of FIG. 13 representing ranges of actual values (in decimal form) and the right hand part representing values of SIZE for the different ranges. The second word (AMPLITUDE) of the pair represents the amplitude of the sample of non-zero value in the form of a number of bits determined by the value of SIZE. For a positive non-zero value, AMPLITUDE is the result of truncating the non-zero value (in binary form) to have only the number of bits specified by SIZE. For a negative non-zero value, the non-zero value is decremented by one and the same truncation procedure is followed. To illustrate the nature of the word pair by way of an example, suppose that the detector/modeller 62 detects a run of 4 samples of zero value followed by a sample having a value (amplitude) of +7. In this case, the word pair will be as follows:

[4,3][111].

The number 4 (or, more accurately, its binary equivalent, namely 0100) for RUNLENGTH indicates that the length of the run of zero value samples is 4. The number 3 (or, more accurately, its binary equivalent, namely 0011) for SIZE indicates (as can be seen from FIG. 13) that 3 bits are used to represent the number +7, namely the amplitude (in decimal form) of the sample of non-zero value (amplitude). The number 111 is in fact the amplitude (+7) of the sample of non-zero value expressed in binary form and truncated to 3 bits.

It will be appreciated that the above operation will be carried out for the whole of each scan and that a sequence of word pairs will be generated for each scan. The number of word pairs (that is, the length of the sequence of word pairs) generated for each scan will depend upon the picture content. In general, the greater the number and length of runs of zero value samples, the lesser the number of word pairs.

The operation of the detector/modeller 62 as so far described represents only the first of two stages of data (bit) rate reduction carried out in the detector/modeller. This first stage represents a reduction in bit rate resulting from the above-described reduction of information effected in the quantizer 14A that results (without perceptible degradation in picture content) in a large number of samples of zero value (and, more especially, runs thereof) emerging from the quantizer, especially in the data relating to the ac sub-bands.

The second stage of data rate reduction effected in the detector/modeller 62 is achieved as follows. The first of each of the above-mentioned word pairs is replaced in the data outputted from the detector/modeller 62 with a code therefor looked up in the VLC PROM 66. The VLC PROM 66 stores a respective such code for each possible value of the first word. The codes are of different lengths, and their lengths are selected such that the length of each code is, at least approximately, inversely proportional to the probability of the associated word value occurring. In this way, a further reduction in the data (bit) rate, resulting from entirely loss-free compression, is achieved.

The operation of the entropy encoder 16A shown in FIG. 12 will now be described for the case in which the data arriving from the quantizer 14A relates to the dc sub-band and is therefore directed by the switch 60 to the DPCM 64. The dc sub-band (unlike the ac sub-bands) is subjected to DPCM treatment. Since the dc sub-band contains the intensity information of the original image (field), it has similar statistics to the original image. The ac sub-bands, on the other hand, contain sparse image edge information separated by zero value data and thus have completely different statistics to the dc sub-band. Consequently, it is believed desirable to entropy encode the ac and dc sub-band data separately and in respective different manners to minimize the overall data rate.

Specifically, the dc sub-band data is treated, firstly, in the DPCM 64, prior to entropy encoding proper. The DPCM 64 uses a previous sample predictor with no quantization of the error data, because the fact that the dc sub-band data represents only a small proportion of the overall data means that high complexity DPCM treatment is difficult to justify. The DPCM 64 decorrelates (adjusts the probability distribution of) the dc sub-band samples so that a greater degree of compression can be achieved in the modeller 72.

Next, entropy encoding proper, resulting in a reduction in the data rate, is carried out in the data modeller 72. The modeller 72 operates similarly to the detector/modeller 62, except that there is no detection of runs of zero value samples, such runs being much less likely in the dc sub-band.

The modeller 72 models the incoming data by converting the incoming data to a sequence of word pairs of the following form:

[SIZE][AMPLITUDE].

As in the case of the ac sub-band data, SIZE is looked up from the FLC table of FIG. 13 (in the FLC PROM 76) and indicates the number of bits used to represent AMPLITUDE. The bits used to represent AMPLITUDE are determined in the same way (truncation) as in the case of ac sub-band data. The word SIZE is then encoded in that it is replaced in the data outputted from the modeller 72 with a code therefor looked up in the VLC PROM 74. The VLC PROM 74 stores a respective such code for each possible value of the word. The codes are of different lengths, and their lengths are selected such that the length of each code is, at least approximately, inversely proportional to the probability of the associated word value occurring. In this way, a further reduction in the data (bit) rate, resulting from entirely loss-free compression, is achieved.

Figure 14:
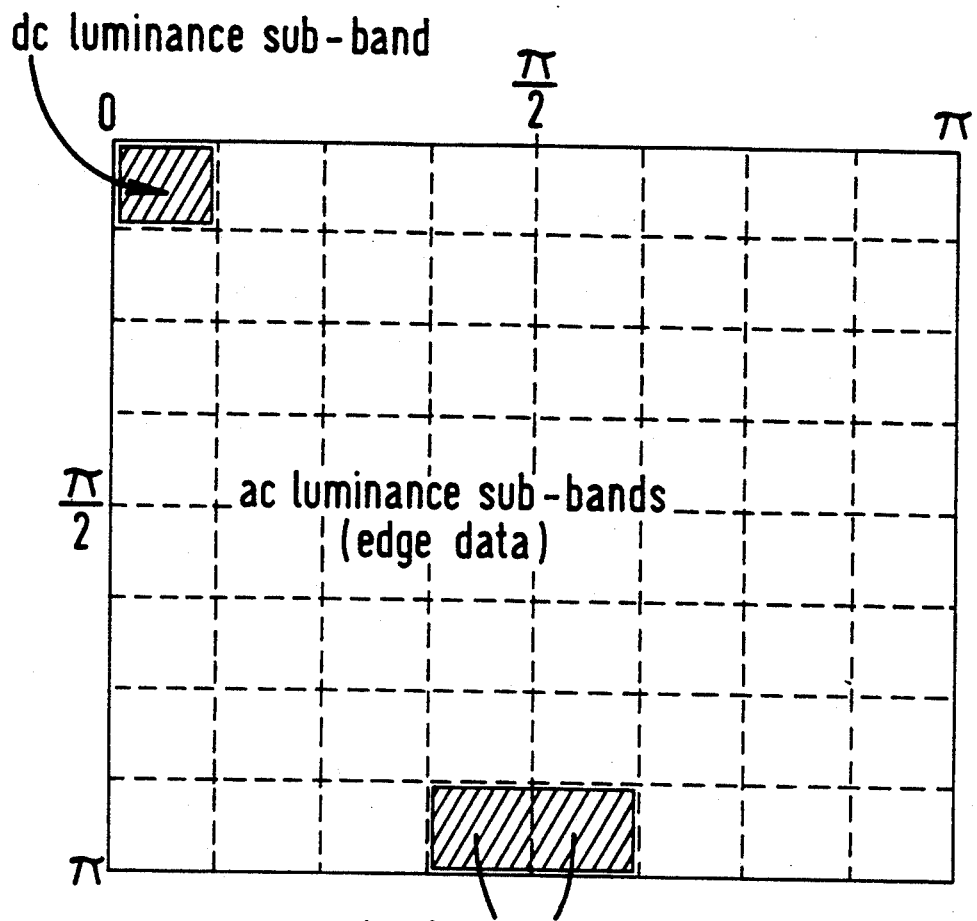
FIG. 14 shows a sub-band filtered field of an NTSC composite color video signal, sampled at four times its color sub-carrier frequency, on the two-dimensional frequency plane.

FIG. 14 is a graph, corresponding to FIG. 4, showing, on the two-dimensional frequency plane, what the inventors have discovered happens when a field of a digital NTSC composite video signal, sampled at a frequency equal to four times the color sub-carrier frequency fsc (fsc is approximately equal to 3.58 MHz), is sub-band filtered in a video signal compression apparatus as described above. The dc and ac luminance data is distributed among the 64 sub-bands in substantially the same way as described above for a component (luminance) signal. Surprisingly, however, it was found that the chrominance data, or at least the chrominance data that is needed, is largely (substantially) restricted to two only of the sub-bands (shown shaded in FIG. 14), namely to those two adjacent sub-bands (hereinafter referred to as "dc chrominance sub-bands") at the bottom center in FIG. 14. Attempts have been made on an ex post facto basis to explain this phenomenon.

As regards the horizontal positioning of the dc chrominance information, this seems on consideration to be appropriate since it should be centered around the position pi/2 along the horizontal axis of FIG. 14 by virtue of the use of a sampling frequency equal to 4.fsc. Thus, if a sampling frequency of other than 4.fsc were used, the dc chrominance information would be displaced horizontally from the position shown in FIG. 14. If this were the case, the horizontal positioning of the sub-bands to be treated as the dc chrominance sub-bands would differ from that described above.

Figure 15:
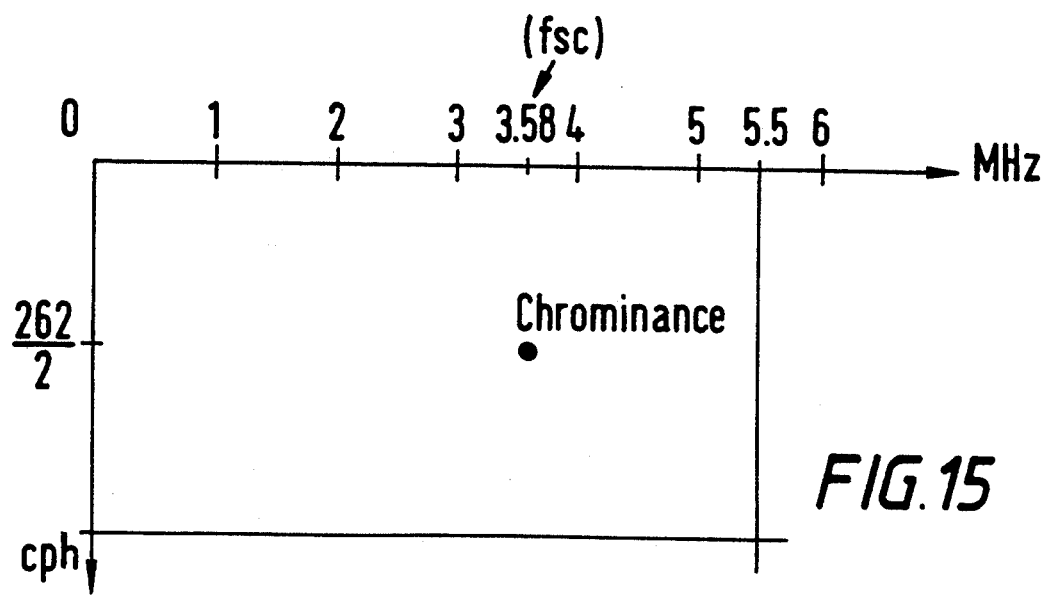
FIG. 15 is a graph showing the two-dimensional frequency content of a field of an analog NTSC composite color video signal.

As regards the vertical positioning of the dc chrominance information in FIG. 14, this can be explained as follows. FIG. 15 is a graph showing the two-dimensional frequency content of a field of an analog NTSC composite color video signal, the horizontal axis being in units of MHz and the vertical axis being in units of cycles per picture height (cph). It is of course known that analog NTSC is characterized by a luminance bandwidth of 5.5 MHz and a chrominance bandwidth of 1.3 MHz modulated about the color sub-carrier frequency of 3.58 MHz. It is also known that the number of sub-carrier cycles per line is 227.5, as a result of which the phase of the sub-carrier is shifted by 180 degrees for each line. This is responsible for a modulation of the chrominance signal vertically, which, as shown in FIG. 15, leads to the chrominance being centered at a spectral position of 131.25 cph. This appears to explain the vertical positioning of the chrominance information in FIG. 14. Thus, the process of modulation generates lower and upper sidebands. Since the vertical carrier frequency is at the Nyquist limit frequency, the upper sidebands are on the other side of the Nyquist limit and thus do not form part of the frequency plane of FIG. 14. Therefore, for NTSC, the dc chrominance data will appear at the bottom of FIG. 14.

As regards the horizontal extent of the dc chrominance information, the fairly harsh filtering (horizontal bandwidth restriction) to which the color (chrominance) information is subjected before it is modulated onto the luminance information appears to explain why the horizontal extent of the chrominance is restricted as shown in FIG. 14, namely so that it falls largely within two horizontally adjacent ones of the 64 sub-bands employed in this case, that is so that the horizontal extent is equal to about pi/4. (In fact, as explained below, the dc chrominance data in fact "spills over" somewhat into the two sub-bands in the bottom row of FIG. 14 that are horizontally adjacent to those shown shaded.)

It seems on reflection that the vertical extent of the needed color information in FIG. 14 is restricted to about the height of one of the sub-bands, namely about pi/8, for the following reason. It is probable that the dc chrominance information is wholly or largely restricted to the two sub-bands shown shaded at the bottom of FIG. 14. It is likewise probable that ac chrominance appears in at least some of those sub-bands above the two shown shaded at the bottom of FIG. 14. However, since the human psychovisual system has a low sensitivity to high frequency (ac) chrominance information, it appears to produce subjectively acceptable results if any such sub-bands that are co-occupied by ac luminance and ac chrominance information are treated as if they are occupied only by ac luminance information.

However, whatever the explanation, the restricted bandwidth (in both directions) of the needed color information has proven very fortunate because, as is explained below, it leads to the advantageous effect that, with very minor modification, the apparatus as described above can handle an NTSC composite color video signal. Thus, conversion of the signal to component form, and tripling of the hardware to handle the three components separately, is not necessary, leading to a large saving in expense.

The only modification that has to be made to the apparatus as described above to enable it to handle an NTSC color composite signal is to change the numbers in the quantization matrix 52 that determine the amount of quantization of the sub-bands that contain the dc chrominance data, namely the two dc chrominance sub-bands as shown shaded in FIG. 14. Specifically, instead of being heavily quantized as high frequency ac luminance sub-bands of relatively little importance, the two sub-bands should be relatively lightly quantized so as to preserve the dc chrominance information. The amount of quantization is in fact desirably reduced to about the same level as applied to the dc luminance sub-band. The necessary effect can therefore be achieved by changing the two bottom center numbers in the quantization matrix as represented in FIG. 7 from their values of 1856 and 2491, for a component (luminance) signal, to 68 (or thereabouts) for an NTSC composite signal. This is shown schematically in FIG. 7.

In principle, no changes other than the above-described change to two numbers in the quantization matrix 52 are necessary to enable the apparatus to handle a digital NTSC composite color video signal. In particular, it is to be noted that the (now lightly quantized) dc chrominance sub-bands can be handled in the quantizer 14A and entropy encoder 16A together with, and in the same manner as, the ac luminance sub-bands.

Figure 10:
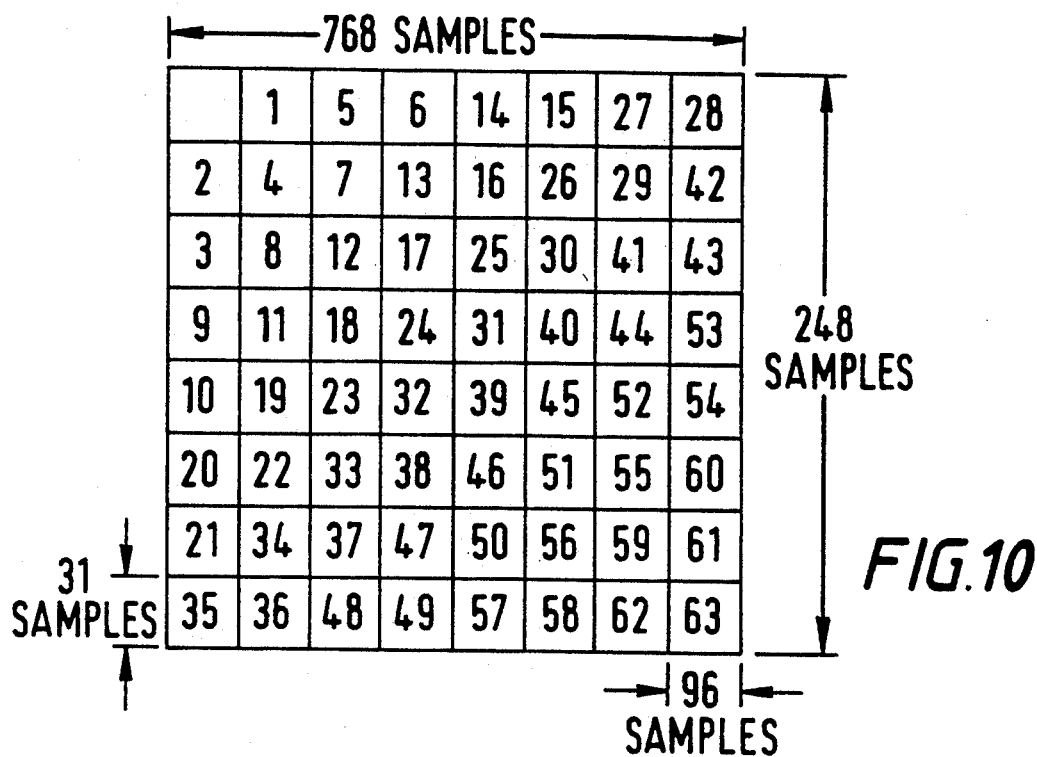
FIG. 10 is a diagram showing how zig-zag scanning of the ac sub-bands is carried out in the quantizer.

Although, in principle, only the above-described change in the quantization is necessary to enable the apparatus to handle a digital NTSC color composite signal, another change that can advantageously be made is as follows. The zig-zag sequence or order in which, for a component (luminance) signal, the 63 sub-bands other than the dc luminance sub-band are quantized and then entropy encoded is, as explained above, shown in FIG. 10. It will be seen that, in the case of a digital NTSC color composite signal, the dc chrominance sub-bands have the positions 49 and 57 in the sequence. This could result in a decrease in the efficiency of compression in that the dc chrominance sub-bands are much more likely than the adjacent sub-bands in the sequence to contain non-zero value samples: that is, they could break up runs of zero value samples. (This is even more likely in the case of PAL than NTSC because, as explained below, in the case of PAL there are four dc chrominance sub-bands positioned in the center of the frequency plane as shown in FIG. 14.) Thus, preferably, the apparatus is further modified in that the sequencer 29A (or 29B) is modified to change the zig-zag sequence so that the dc chrominance sub-bands occupy (in any specified order) the first positions in the sequence and the remaining sub-bands occupy the remaining positions in the sequence in the same order as before. That is, in the case of an NTSC signal, and using the same numbering system for the sub-bands as shown in FIG. 10, the sequence will comprise, in the following order, sub-band 49 (or 57), sub-band 57 (or 49), sub-bands 1 to 48, sub-bands 50 to 56, and sub-bands 58 to 63. (The changed sequence that would be adopted in the case of a PAL signal, as will be clear from the description given below with reference to FIG. 17, will be sub-bands 24, 31, 32 and 39 (in any order), sub-bands 1 to 23, sub-bands 25 to 30, sub-bands 33 to 38, and sub-bands 40 to 63.) The sequencer 58 in the quantizer 14A (if separate from the sequencer 29A or 29B) is modified in correspondence with the way in which the sequencer 29A or 29B is modified in order to ensure that each sub-band is appropriately quantized. That is, instead of outputting the 63 numbers for the sub-bands other than the dc luminance sub-band as shown in FIG. 7 in the same zig-zag order as that in which the sub-bands other than the dc luminance sub-band are numbered 1 to 63 in FIG. 10, the sequencer 58 is modified so that it outputs those numbers in an order which is modified in the same way in which the zig-zag sequence of quantizing the sub-band filtered samples is (as was just explained) modified.

Figure 16:
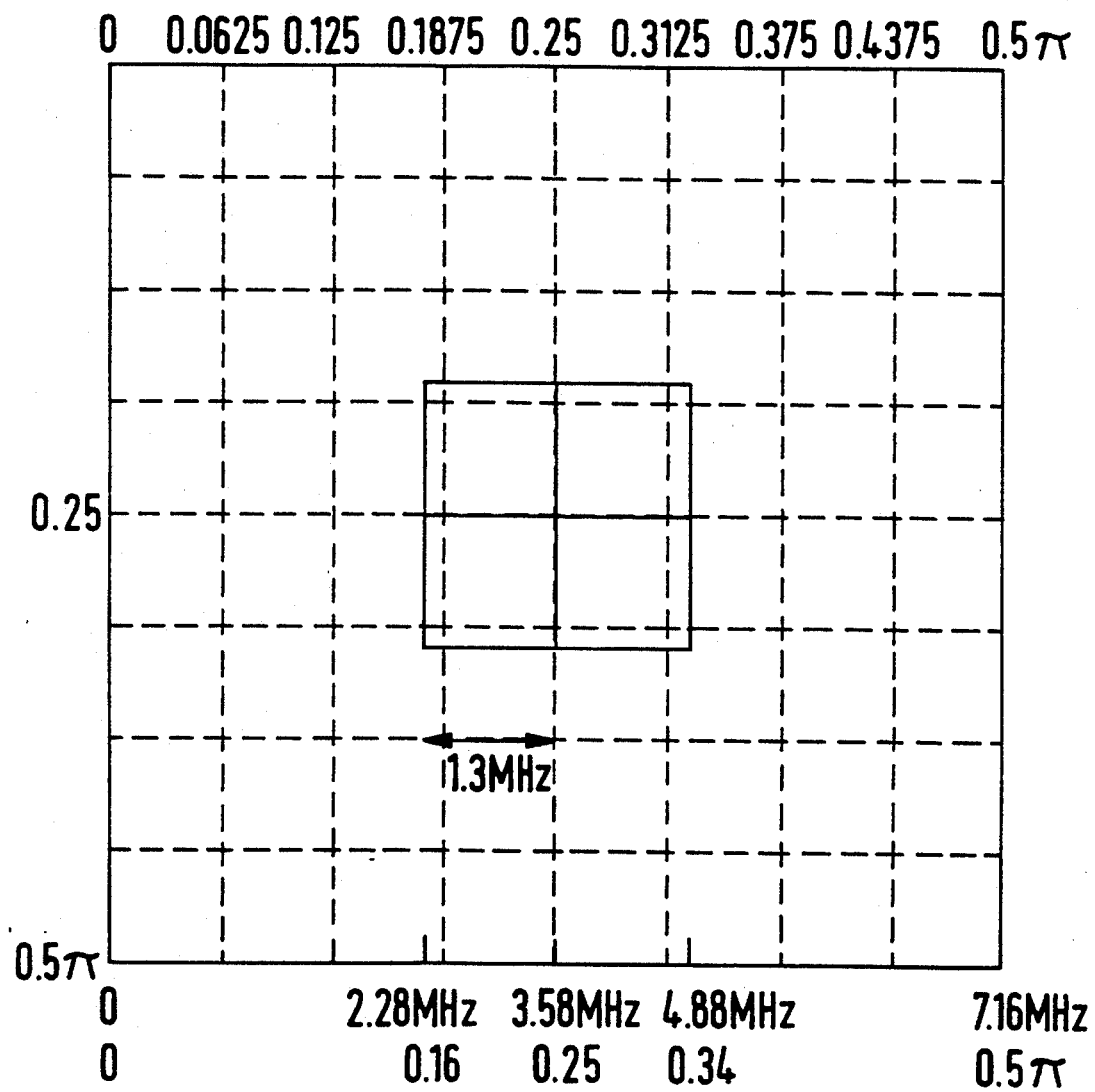
FIG. 16 shows a frame of an NTSC composite color video signal, sampled at four times the color sub-carrier frequency, on the two-dimensional frequency plane.

Further consideration was given to the phenomenon of spectral concentration of the color information by examining the two-dimensional frequency plane for a frame (as opposed to a field) of a digital NTSC composite color video signal sampled at 4.fsc, as shown in FIG. 16. It will be seen that the composite data in the center of the frequency plane is composed of four distinct regions due to modulation of the negative frequencies. These four regions are identical except for frequency inversion and a phase shift. Ideally, as explained below, the chrominance data should be restricted to a small number of the sub-bands. FIG. 16 indicates that the use of 64 (8×8) sub-bands is a good choice in this respect.

Ideally, the horizontal extent or span of the sub-bands should equal the baseband chrominance bandwidth for efficient compression. This is because, in this case, the chrominance information falls exactly within the relevant sub-bands, that is it occupies the whole of those sub-bands and does not occupy parts of adjacent sub-bands, so that all of the dc chrominance information is lightly quantized and no substantial amount of adjacent ac luminance information is lightly quantized. In other words, a smaller span would lead to the chrominance data falling into a greater number of sub-bands (which is in conflict with the above-mentioned requirement of keeping the number of chrominance sub-bands as small as possible) and a greater span would lead to the adjacent luminance data not being appropriately quantized.

It will be seen from FIG. 16 that there is in fact a small overlap or "spill over" of chrominance data into adjacent sub-bands which are treated as ac luminance sub-bands, whereby the overlapping parts of the chrominance will be (heavily) quantized in accordance with the quantization thresholds set for those adjacent sub-bands. In practice, it is believed that the results will nonetheless be subjectively acceptable. The overlap occurs in the horizontal direction because, as can be seen from FIG. 16, the horizontal extent of each sub-band is approximately equal to 0.9 MHz, whereas the chrominance data has a bandwidth (two sidebands) of 1.3 MHz, which is slightly larger. Provided, of course, that the overlap is not so large that a significant amount of low-frequency chrominance information spills over into adjacent sub-bands which are treated in the quantization process as ac luminance sub-bands, the overlap will generally be tolerable because, as explained above, it will comprise higher frequency chrominance information to which the human psychovisual system is not very sensitive. However, the overlap could be avoided, in theory, by slightly increasing the size of the sub-bands in either or both directions, that is by slightly decreasing the total number of sub-bands. Thus, an inspection of FIG. 16 indicates that the overlap would be reduced if a 7×7 or a 6×6 array were used. While such an array is realizable in theory, it could not be realized in the case of the "tree" or "hierarchical" QMF structure described with reference to FIGS. 2 and 3 because this can only produce, in each direction, a number of sub-bands which is an integral power of two. Thus, if the tree structure is to be used, the overlap described above could be avoided only by going down to a 4×4 array. While a 4×4 array is usable and produces acceptable results, it would result in the extent of the sub-bands that would have to be used as chrominance sub-bands (which, similarly to FIG. 14, would be the two at the bottom center of the 4×4 array) being substantially greater than the extent of the dc chrominance data. Also, it would reduce the efficiency of compression by virture of the fact that the number of sub-bands would be greatly reduced. The reason for this is as follows.

The amount of compression achievable by virtue of the quantization step decreases, up to a certain extent, as the number of sub-bands decreases. This is because the ratio between the number of ac luminance sub-bands and the number of dc (luminance and chrominance) sub-bands will increase with the total number of sub-bands and the ac sub-bands are on average more heavily quantized than the dc sub-bands. Thus, for example, in above-described case in which there are 64 sub-bands, of which one is a dc luminance sub-band and two (for NTSC)—or four (for PAL, see below)—are dc chrominance sub-bands, either 61 (for NTSC)—or 59 (for PAL)—of the 64 sub-bands are ac luminance sub-bands.

That is, either 61/64 or 59/64 of a field can be relatively heavily quantized on average, thereby enabling a higher degree of compression to be achieved than would be the case if the number of sub-bands were less than 64. (Thus, for example, if 16 (4×4) sub-bands were used, only 13/16 of a field (for NTSC) would be ac luminance sub-bands.) Therefore, it is in general desirable to use as large a number of sub-bands as is practical, bearing in mind, however, that hardware realization will become impractical if too many sub-bands are used. Also, if a large increase (over an 8×8 array) is made in the number of sub-bands, there will be no net benefit (or at least not a greatly increased benefit) because more than two of the sub-bands (for NTSC) or more than four of the sub-bands (for PAL) may have to be treated (due to extensive overspill of chrominance information) as dc chrominance sub-bands. At present, the use of an 8×8 square array (or a non-square array of similar size) is believed to provide a good compromise between the above constraints, though, as mentioned above, a 4×4 array is usable. Also arrays having horizontal and vertical extents of 4 and 8, and 8 and 4, respectively, are usable, the latter being considered promising. At the very least, it is highly preferable for the number of ac luminance sub-bands to exceed the number of dc luminance and chrominance sub-bands.

As an alternative to ignoring limited overspill or increasing the size of the sub-bands to reduce or remove overspill, it is possible to take account of the fact that some chrominance information appears in bands adjacent to these treated (in the quantization operation) as dc chrominance sub-bands by quantizing the adjacent sub-bands to an extent intermediate that to which they would be quantized if considered as ac luminance sub-bands only, and that to which the sub-bands treated as dc chrominance sub-bands are quantized. The actual extent of quantization of the adjacent sub-bands might well have to be established empirically.

As mentioned above, the use of a sampling frequency equal to four times the color sub-carrier frequency is preferred since it has the effect of centering the dc chrominance sub-bands about pi/2 in the horizontal direction, that is locating them in the horizontal sense where shown in FIG. 14. However, other sampling frequencies can be used.

The foregoing description with reference to FIGS. 14 to 17 has concentrated on NTSC composite color video signals. It is to be noted, however, that the technique outlined above can be applied to other broadcast standard composite color video signals. The application of the technique to PAL composite color video signals will now be described.

Figure 17:
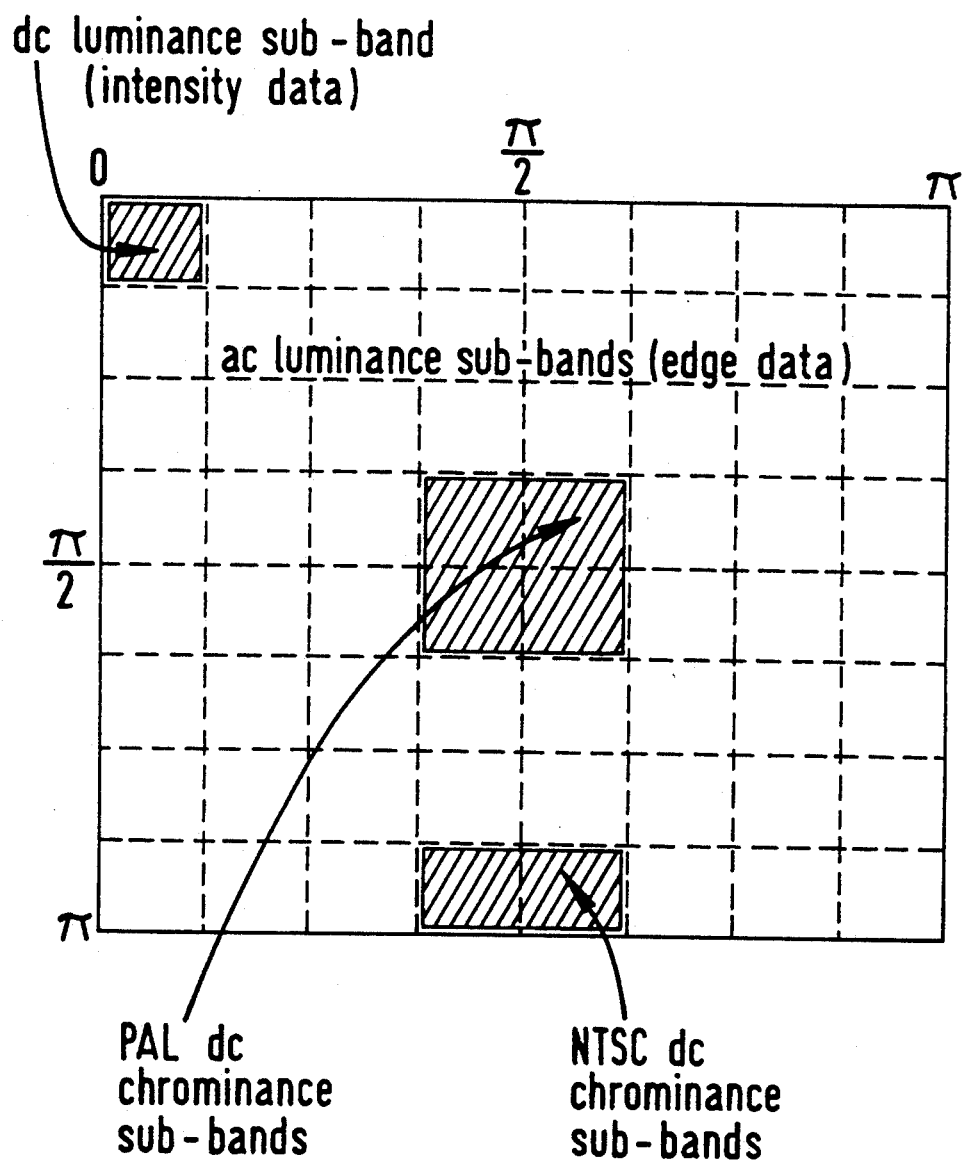
FIG. 17 is a view corresponding to FIG. 4, but showing on the two-dimensional frequency plane both the sub-band filtered field of an NTSC composite color video signal, and a sub-band filtered field of a PAL composite color video signal, each sampled at four times its color sub-carrier frequency.

FIG. 17 is a view corresponding to FIG. 4, but showing on the two-dimensional frequency plane both the sub-band filtered field of an NTSC composite color video signal, and a sub-band filtered field of a PAL composite color video signal, each sampled at four times its color sub-carrier frequency. It will be seen that, in the case of PAL, the chrominance information occupies (in the case of an 8×8 array of sub-bands) the four sub-bands (shown shaded) clustered at the center, rather than, as in the case of NTSC, the two at the bottom center, namely those numbered 24, 31, 32 and 39 in FIG. 10.

The only modification that has to be made to the apparatus as described above to enable it to handle a PAL color composite signal is to change the numbers in the quantization matrix 52 that determine the amount of quantization of the sub-bands that contain the chrominance data in the case of PAL, namely the four PAL dc chrominance sub-bands as shown shaded in the center of FIG. 17. Specifically, instead of being heavily quantized as high frequency ac luminance sub-bands of relatively little importance, the four sub-bands should be relatively lightly quantized so as to preserve the dc chrominance information. As in the case of NTSC, for PAL also the amount of quantization is in fact desirably reduced to about the same level as applied to the dc luminance sub-band. The necessary effect can therefore be achieved by changing the four numbers clustered in the center of the quantization matrix as represented in FIG. 7 from their values of 260,396,396 and 581, for a component (luminance) signal, to 68 for a PAL composite signal. This is shown schematically in FIG. 7.

Further, in the case of PAL also, the apparatus is desirably further modified (as already indicated above) to change the zig-zag sequence of treatment of the 63 sub-bands other than the dc luminance sub-band so that the four dc chrominance sub-bands come first.

Since, in the case of PAL, the chrominance data occupies 4 of the 64 sub-bands, whereas in the case of NTSC the chrominance data occupies only 2 of the 64 sub-bands, there is a slightly lower potential for compression (as compared to NTSC) for PAL. Specifically, as indicated above, only 59/64 of a field in the case of PAL, as opposed to 61/64 of a field in the case of NTSC, is occupied by ac luminance sub-bands and therefore can be relatively heavily quantized on average.

Although the above-described apparatus operates on a field-by-field basis, which will generally be more convenient, it could instead operate on a frame-by-frame basis. In this case the sub-bands would have twice the number of samples in the vertical direction and the various field stores would be replaced by frame stores.

Further, although the above-described apparatus operates only on an intra-field basis, whereby sub-band filtering is effected in two dimensions or directions only, namely the horizontal and vertical spatial directions, it could in principle be extended to operate also on an inter-field or inter-frame basis, whereby sub-band filtering would in this case be effected in three dimensions or directions, namely the horizontal and vertical spatial directions and the temporal dimension or direction.

Also, the apparatus described above may be embodied in an alternative manner such that the sub-band data in the output store 28 of the sub-band filtering arrangement 12A or 12B is scanned in other ways than that described above with reference to FIGS. 9 to 11, according to which the dc sub-band is scanned first and the 63 ac sub-bands are then zig-zag scanned in the sequence or order shown in FIG. 10 or, in the case of a composite color signal, a modified version of that sequence in which the dc chrominance sub-bands come first. The sequence could for example be changed so that the ac sub-bands are scanned in a series of straight lines rather than in a series of zig-zag diagonal lines. Alternatively, as is described in our copending U.S. patent application Ser. No. 07/810,336, which is assigned to the assignees hereof, which was filed on the same day as the present application, and which corresponds to UK Patent Application No. 9100593.4 filed Jan. 11, 1991, instead of first scanning the dc sub-band and then scanning the 63 ac sub-bands in a zig-zag sequence it is possible to scan all the 64 sub-bands in zigzag (or other) sequence.

According to another alternative manner of embodying the apparatus described above, the entropy encoder 16A of FIG. 12 is modified by eliminating the DPCM 64, the data modeller 72, the VLC PROM 74 and the FLC PROM 76, and connecting the output of the switch 60, that formerly was connected to the DPCM 64, directly to the multiplexer 70. In this event, whereas all the quantized data derived from the ac sub-bands are entropy encoded, the data derived from the dc sub-band are not entropy encoded, which in some cases may be advantageous. Naturally, this results in a reduction in overall signal compression, though the reduction is minor since the dc sub-band is of course only one of many sub-bands whereby the bulk of the quantized data is entropy encoded.

Figure 18:
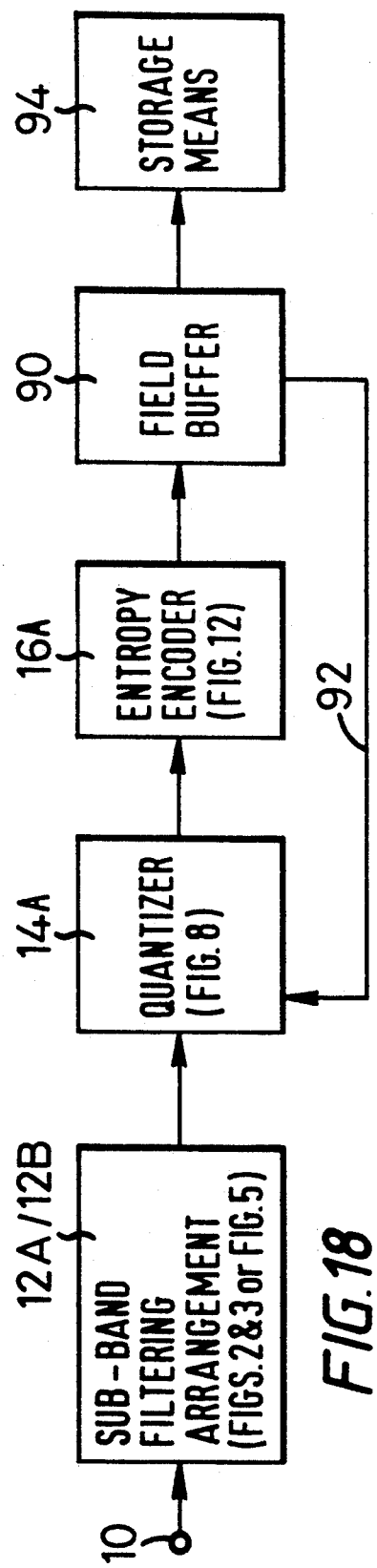
FIG. 18 is a block diagram of a video signal storage apparatus embodying the invention.

FIG. 18 is a block circuit diagram of a video signal storage apparatus embodying the invention. The video signal storage apparatus of FIG. 18 comprises a video signal compression apparatus or means as described above, namely the sub-band filtering arrangement 12A described above with reference to FIGS. 2 and 3 or the sub-band filtering arrangement 12B described above with reference to FIG. 5, the quantizer 14A described above reference to FIG. 8, and the entropy encoder 16A described above reference to FIG. 12. The video signal compression apparatus or means may include a field buffer 90 which, as shown, may be connected to the output of the entropy encoder 16A, though it could instead be connected between the quantizer 14A and the entropy encoder 16A. A signal indicative of the content (state of fullness) of the field buffer 90 may be fed by a line 92 back to the scale factor generator 56 (FIG. 8) of the quantizer 14A so as to control the scale factor in such a manner that the amount of data per field after compression never exceeds a predetermined value and, on the other hand, never falls greatly below the predetermined value. Thus, each compressed field can be recorded in or on a predetermined part of a storage medium.

The video signal compression apparatus or means is followed by a storage means 94 for storing successive fields or frames of the compressed video signal. The storage means 94 may take a variety of forms. It may, for example, comprise a random access memory (RAM) recorder, that is an amount of RAM sufficient to store many fields or frames. It may instead comprise a disk recorder, that is an arrangement for writing the compressed signal, for example magneto-optically, to a magnetic storage medium in the form of a magnetic disk. Further, the storage means 94 may instead comprise a video tape recorder (VTR), that is to say an arrangement for writing the compressed signal to a magnetic storage medium in the form of a magnetic tape.

Figure 19:
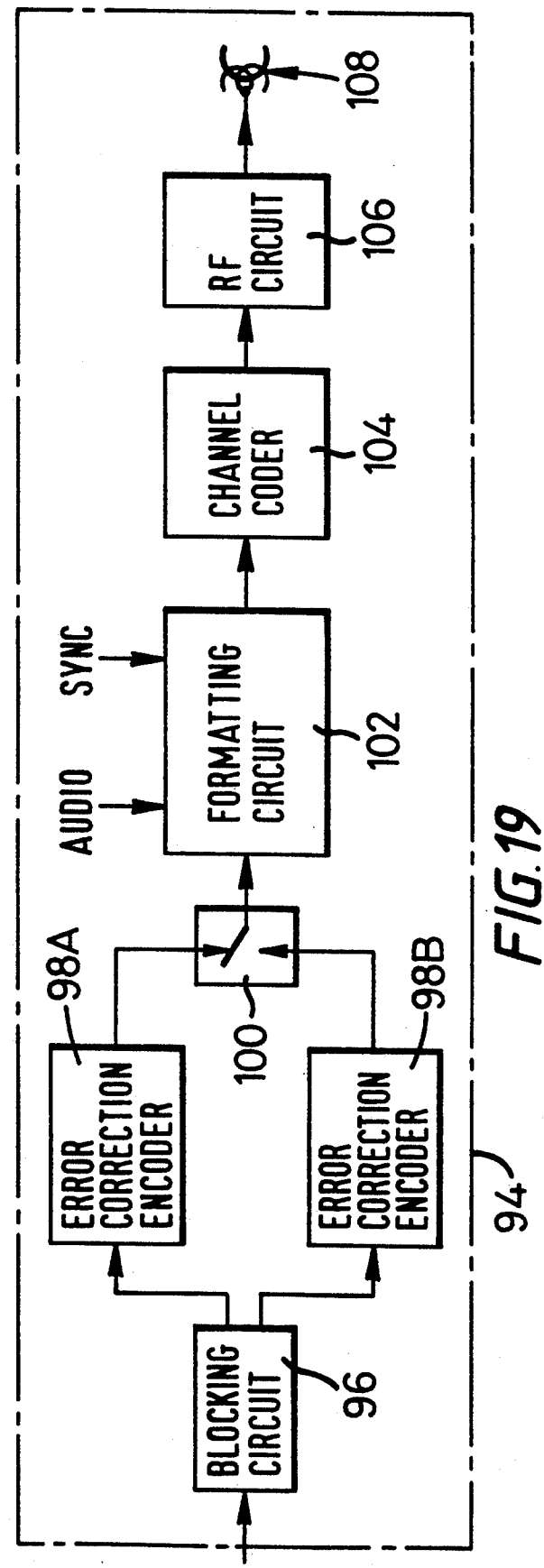
FIG. 19 is a block diagram of a storage means forming part of the apparatus of FIG. 18.

FIG. 19 shows one way in which the storage means 94 may be implemented in the form of a VTR. The storage means 94 of FIG. 19 comprises a blocking circuit 96 which divides compressed data read from the field buffer 90 into segments of fixed length and selectively supplies them to one of two error correction encoders 98A and 98B. Specifically, by way of an example, the compressed data resulting from quantization and entropy encoding of the dc luminance sub-band is directed to the error correction encoder 98A, while the compressed data resulting from quantization and entropy encoding of the other sub-bands is directed to the error correction encoder 98B. The encoder 98A applies a more robust (more highly protective) error correction code than the encoder 98B, whereby the data derived by compression from the dc luminance sub-band is subjected to more robust error correction than the data derived by compression from the other sub-bands. This feature provides that, in general in the case of reproduction, the dc sub-band (of most importance to the human psychovisual system) is given special attention from the standpoint of error correction so as to minimize degradation of picture quality as a result of compression and storage, and subsequent reproduction and expansion. Further, in the specific case of reproducing and expanding data in a shuttle (high speed reproduction) mode of the VTR, this feature provides the further advantage that the probability of successful data recovery is enhanced.

The error correction encoded data emerging from the encoders 98A and 98B is recombined and directed by a switch circuit 100 to a formatting circuit 102 in which that data is arranged, together with (at least) audio data and synchronization data, into a format to be recorded on tape. The operation performed by the formatting circuit 102 is thus conventional, though (as explained below) the actual format employed is preferably not conventional.

Formatted data outputted by the formatting circuit 102 is, in conventional manner, directed via a channel coder 104 and a radio frequency (RF) circuit 106, containing a modulator and so forth, to a recording head 108 which is mounted on a drum and is moved in use with respect to a tape in contact with the drum so as to record the formatted data in slanting tracks on the tape.

By appropriate design of the formatting circuit 102, the data derived by compression from the dc luminance sub-band can be recorded on tape in a different manner than the data derived by compression from the other sub-bands. This leads to the advantage that the dc luminance sub-band can be recorded so as to improve the probability of data recovery in shuttle.

Figure 20:
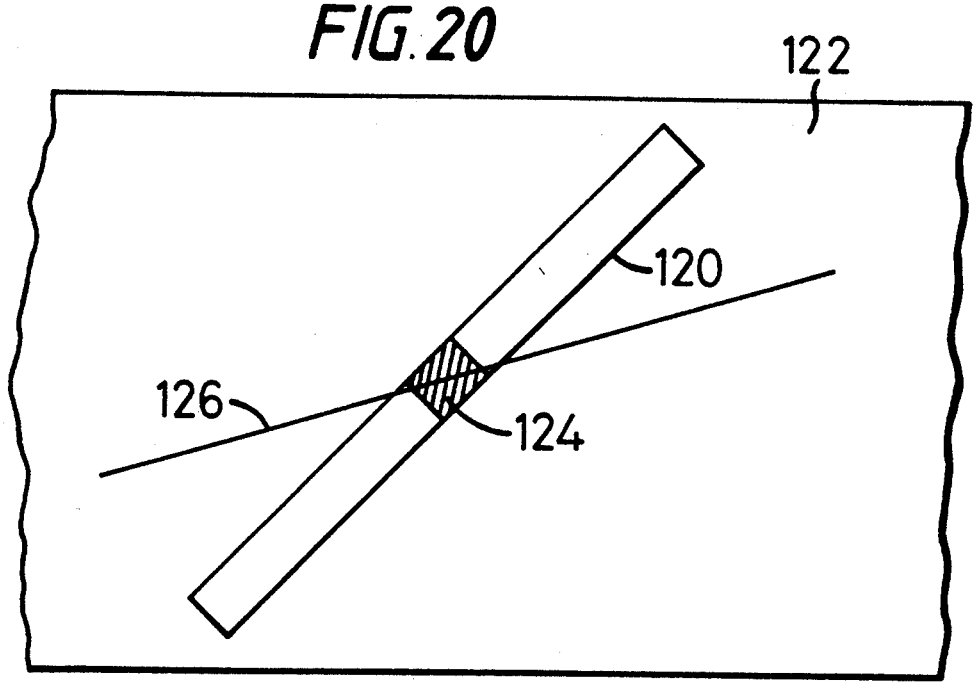
FIGS. 20 and 21 show respective examples of how a compressed video signal may be recorded on a magnetic tape by the storage means of FIG. 19.

The dc sub-band information can thus, for example, be recorded at predetermined positions along the tracks on the tape, for example half way along them as shown in FIG. 20, in which a slanting track 120 recorded on a tape 122 has the dc sub-band information recorded at a portion 124 thereof shown shaded. In this regard, when the VTR is in the shuttle mode a reproducing head thereof is generally unable (except perhaps if it is a dynamic tracking head and the shuttle speed is less than about two or three times the normal reproduction speed) to follow the tracks. Thus, the locus of travel (shown at 126 in FIG. 20) of the reproducing head in the shuttle mode is skewed with respect to the tracks and therefore crosses the tracks rather than follows them. Thus, information is recovered only where the crossings take place, rather than along the whole lengths of the tracks. It is a matter of relative ease to synchronize the movement of the reproducing head with the tracks so that the locus of travel of the head always crosses the tracks at the predetermined positions at which the dc luminance sub-bands of successive fields are recorded. Thus, while recovery of data from other parts of the tracks may be difficult or impossible to achieve in the shuttle mode, recovery of the dc luminance sub-bands should be achievable with relative ease. An advantage of being readily able to recover at least the dc luminance sub-bands of successive fields is that, as explained above, if that sub-band alone is reproduced, expanded and displayed it is visually intelligible in that it looks like a very heavily filtered version of the original picture. Thus, the position on tape can be visually monitored even at very high shuttle speeds by recovering and viewing only the dc luminance sub-bands of successive fields (possibly together with one or more of the ac luminance sub-bands of lower spatial frequency information content).

Figure 21:
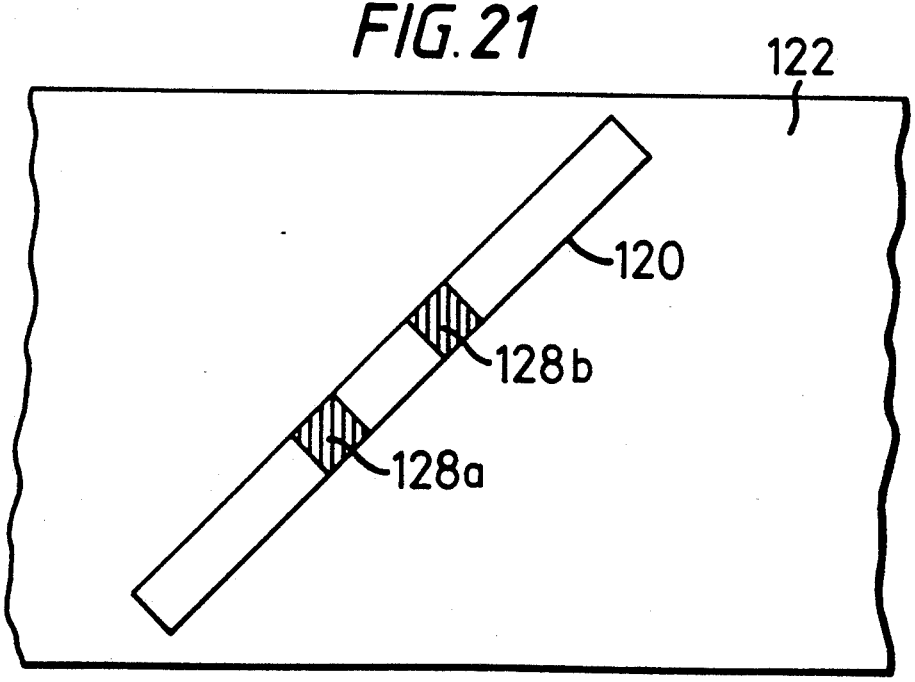

An additional or alternative technique of recording the data derived by compression from the dc luminance sub-band on tape in a different manner than the data derived by compression from the other sub-bands, leading to the advantage that the dc luminance sub-band can be recorded so, as to improve the probability of data recovery in shuttle, comprises recording the data derived by compression from the dc luminance sub-band at two or more places on the tracks: see, for example, FIG. 21, where the dc luminance sub-band data is recorded at two portions (shown shaded) 128a, 128b of the track 120. This can readily be achieved by appropriate design of the formatting circuit 102.

The apparatus described above by way of example with reference to FIGS. 18 and 19 can be modified in a variety of ways. For instance, although in the storage means 94 of FIG. 19 the data derived by compression from the dc luminance sub-band is subjected to one form or level of error correction (in the encoder 98A) and all the data derived by compression from the other sub-bands is subjected to another, common form or level of error correction (in the encoder 98B), a more highly selective form of error correction encoding is possible. In general, each sub-band can be subjected singly, or as part of a group of sub-bands, to its own respective form or level of error correction encoding: this might necessitate redesign of the sequence of quantizing and/or redesign of the entropy encoder 16A so that the data resulting from compression of the sub-bands other than the dc luminance sub-band is readily distinguishable at the output of the entropy encoder. (In this regard, with the arrangement specifically described above, the scanning technique described with reference to FIGS. 9 to 11 results in the ac luminance sub-bands being intermingled before entropy encoding so that the portion of the compressed signal derived from the ac luminance sub-bands cannot readily be divided, after entropy encoding, into parts derived from the different ac luminance sub-bands. However, if, for example, the technique shown in FIG. 9 were modified so that at least some of the sub-bands other than the dc luminance sub-band were scanned in the same way as the dc luminance sub-band, and if those sub-bands were entropy encoded in respective different ways, then the compressed versions of those sub-bands would be readily distinguishable after entropy encoding and could therefore readily be treated differently to one another as regards error correction encoding.)

Preferably, in the case when a composite color video signal is being compressed and stored, the data derived by compression of the dc chrominance sub-bands (as well as the data derived by compression of the dc luminance sub-band) is, due to its relative importance, subjected to more robust error correction encoding than the data derived by compression of the other sub-bands.

Further, in the case of either a component or composite signal, it would be desirable, in view of the relative importance of the information they contain, also to apply more robust error correction encoding to the compressed data obtained from the first few ac luminance sub-bands, that is those of relatively low spatial frequency information content.

The form of implementation of the storage means 94 described above with reference to FIG. 19 can be used, with appropriate changes, for recording on disk or in RAM. While disk storage is in general less error prone than tape storage, the selective or differential encoding may at least in some cases be desirable in the case of disk storage. And, while RAM storage is in general even less error prone, the selective or differential error encoding might in some cases be useful even in the case of RAM storage. A form of formatting similar to that provided in the case of tape storage may be desirable in the case of disk storage, but would be unnecessary in the case of RAM storage.

The apparatus as described above with reference to FIGS. 18 and 19 assumes that only one recording head 108 is needed to record the compressed signal on tape. While a single recording head may be sufficient in some cases, plural heads may have to be used if the data rate is too high for the data to be handled by the limited bandwidth of one head. In that case, the data could be demultiplexed (for example on a line-by-line or sample-by-sample basis)before or after the entropy encoder 16A and the plural demultiplexed data streams each passed to a respective storage means 94 as described with reference to FIG. 19. If the demultiplexing took place before the entropy encoder 16A, the entropy encoder (as well as the storage means 94) would need to be replicated so that there was one for each demultiplexed data stream.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for storing a digital video signal, the apparatus comprising:

signal compression means including a spatial two-dimensional sub-band filtering arrangement for filtering said digital video signal to form a plurality of data sets constituting respective sub-bands of the two-dimensional spatial frequency domain, a quantizer for quantizing said data sets in accordance with respective values, said values being such that the amount of quantization of one of said data sets constituting a sub-band to which dc luminance information of said digital video signal is at least predominantly confined is less than the average of the amounts of quantization of the remaining data sets, and an entropy encoder for selectively encoding the quantized data sets so that said quantized data sets as selectively entropy encoded constitute a compressed video signal;

error correction encoding means for providing different error correction encoding as between different portions of said compressed video signal each derived from a respective one or more of said data sets so as to form an error correction encoded video signal; and storage means for storing said error correction encoded video signal.

2. Apparatus according to claim 1, wherein the storage means comprises magnetic tape storage means.

3. Apparatus according to claim 1, wherein the storage means comprises magnetic disk storage means.

4. Apparatus according to claim 1, wherein the storage means comprises random access memory storage means.

5. Apparatus according to claim 1, wherein said storage means is operative to record the compressed video signal on a magnetic storage medium, and storage control means is provided to cause a portion of the compressed signal derived from said data set constituting said sub-band to which the dc luminance information of the signal is at least predominantly confined to be recorded on said storage medium differently than the remainder of the compressed signal.

6. Apparatus according to claim 1, wherein said storage means is operative to record the compressed video signal in slanting tracks on a magnetic tape, and storage control means is provided to cause a portion of the compressed signal derived from said data set constituting said sub-band to which the dc luminance information of the signal is at least predominantly confined to be recorded on said tracks differently than the remainder of the compressed signal.

7. Apparatus according to claim 6, wherein said storage control means is operative to cause said portion of the compressed signal derived from said data set constituting said sub-band to which the dc luminance information of the signal is at least predominantly confined to be recorded at predetermined positions along at least some of said tracks.

8. Apparatus according to claim 7, wherein said predetermined positions are at the centers of at least some of said tracks.

9. Apparatus for storing a digital video signal, the apparatus comprising:
- signal compression means including a spatial two-dimensional sub-band filtering arrangement for filtering said digital video signal to form a plurality of data sets constituting respective sub-bands of the two-dimensional spatial frequency domain, a quantizer for quantizing said data sets in accordance with respective values, said values being such that the amount of quantization of one of said data sets constituting a sub-band to which dc luminance information of said digital video signal is at least predominantly confined is less than the average of the amounts of quantization of the remaining data sets, and an entropy encoder for selectively encoding at least some of the quantized data sets so that said quantized data sets as selectively entropy encoded constitute a compressed video signal;
- error correction encoding means for providing different error correction encoding of different portions of the compressed video signal each derived from a respective one or more of said data sets so as to form an error correction encoded video signal with more robust error correction encoding being provided to a portion of the compressed video signal derived from said data set constituting said sub-band to which the dc luminance information of the signal is at least predominantly confined than to at least part of the remainder of the signal; and
- storage means for storing said error correction encoded video signal.

10. Apparatus according to claim 9, wherein, in order to enable compression of a digital composite color signal, said quantizer is operative to quantize said data sets in accordance with respective values which are such that the amounts of quantization of each of said one of said data sets constituting said sub-band to which the dc luminance information of the signal is at least predominantly confined and of at least two of said data sets constituting sub-bands to which dc chrominance information of the signal is at least predominantly confined are less than the average of the amounts of quantization of the other data sets, and wherein said error correction coding means is operative to provide more robust error correction encoding to portions of the signal derived from said data set constituting said sub-band to which the dc luminance information of the signal is at least predominantly confined and from said data sets constituting said sub-bands to which the dc chrominance information of the signal is at least predominantly confined than to the remainder of the signal.

11. Apparatus according to claim 10, wherein said quantizer is so operative that the amounts of quantization of said sub-bands constituted by the data sets to which the dc de luminance information and the dc chrominance information is at least predominantly confined are at least approximately the same as one another.

12. Apparatus for storing a digital video signal, the apparatus comprising:
- signal compression means including a spatial two-dimensional sub-band filtering arrangement for filtering said digital video signal to form a plurality of data sets constituting respective sub-bands of the two-dimensional spatial frequency domain, a quantizer for quantizing said data sets in accordance with respective values, said values being such that the amount of quantization of one of said data sets constituting a sub-band to which dc luminance information of said digital video signal is at least predominantly confined is less than the average of the amounts of quantization of the remaining data sets, and an entropy encoder for selectively encoding at least some of the quantized data sets so that said quantized data sets as selectively entropy encoded constitute a compressed video signal;
- storage means for recording said compressed video signal on a magnetic storage medium; and
- storage control means for causing a portion of the compressed video signal derived from said data set constituting said sub-band to which the dc luminance information of said digital video signal is at least predominantly confined to be recorded on said magnetic storage medium at least twice.

13. Apparatus for storing a digital video signal, the apparatus comprising:
- signal compression means including a spatial two-dimensional sub-band filtering arrangement for filtering said digital video signal to form a plurality of data sets constituting respective sub-bands of the two-dimensional spatial frequency domain, a quantizer for quantizing said data sets in accordance with respective values which are such that the amounts of quantization of each of said one of said data sets constituting said sub-band to which the dc luminance information of said digital video signal is at least predominantly confined and of at least two of said data sets constituting sub-bands to which dc chrominance information of the signal is at least predominantly confined are less than the average of the amounts of quantization of the other data sets, and an entropy encoder operative to selectively encode at least some of the quantized data sets; so that said quantized data sets as selectively entropy encoded constitute a compressed video signal; and storage means for storing the compressed video signal.

14. Apparatus according to claim 13, wherein said quantizer is so operative that the amounts of quantization of said sub-bands constituted by the data sets to which the dc luminance information and the dc chrominance information is at least predominantly confined are at least approximately the same as one another.

* * * * *